March 14, 1967 N. L. LAEFER 3,309,468
PRIORITY SERVICE CONTROL EQUIPMENT FOR OPERATOR POSITIONS
Filed Oct. 23, 1963 14 Sheets-Sheet 1

INVENTOR
N.L. LAEFER
BY
Donald M Duft
ATTORNEY

FIG. 3  POSITION LINK PLO
TRUNK GATE, NON-PRIORITY
AND PRIORITY REGISTERS

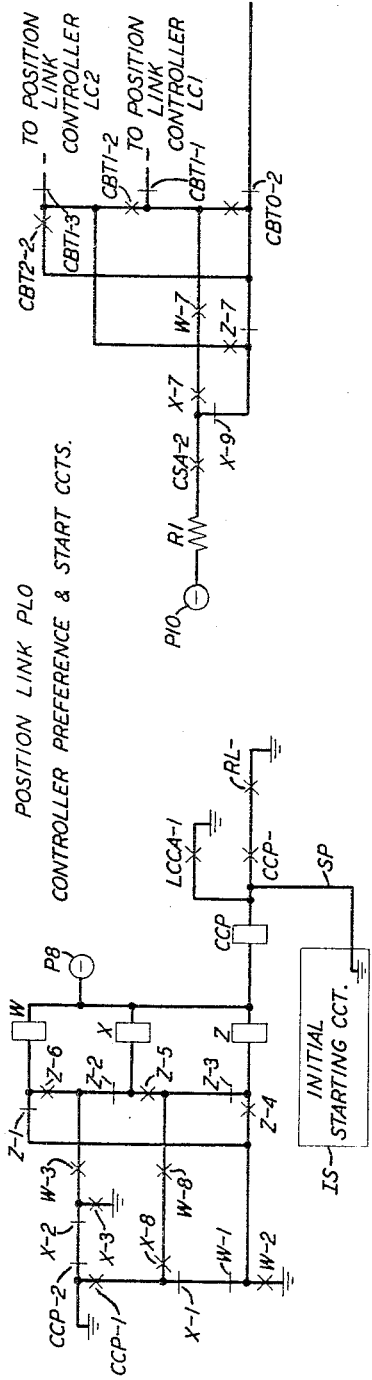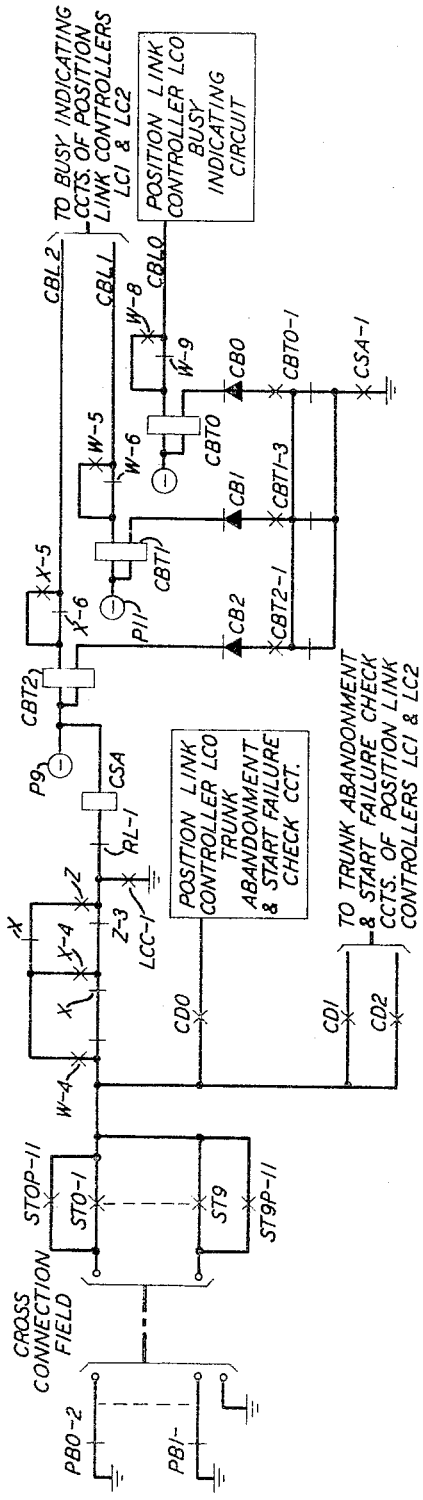
FIG. 6

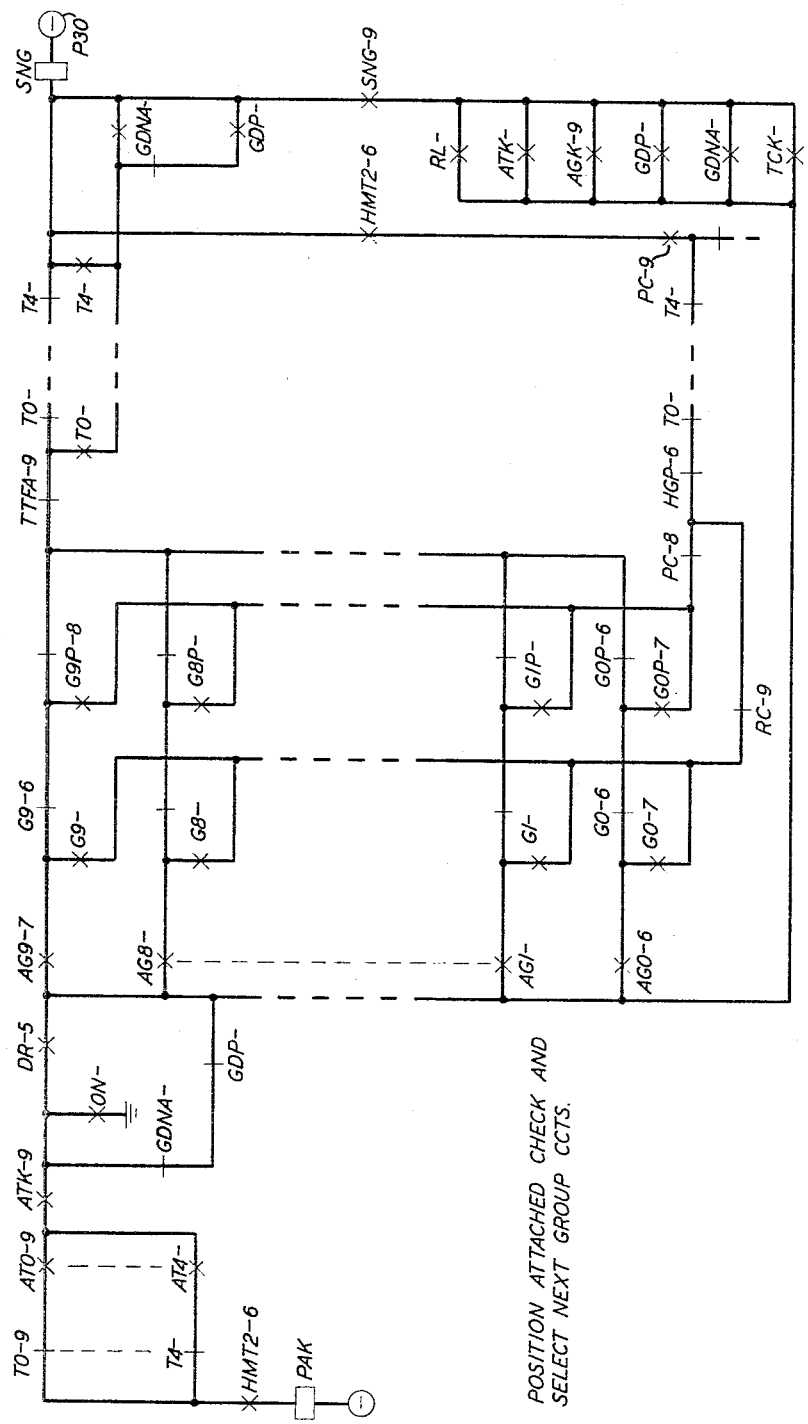

United States Patent Office 3,309,468
Patented Mar. 14, 1967

3,309,468
PRIORITY SERVICE CONTROL EQUIPMENT
FOR OPERATOR POSITIONS
Norman L. Laefer, Brooklyn, N.Y., assignor to Bell Telephone Laboratories, Incorporated, New York, N.Y., a corporation of New York
Filed Oct. 23, 1963, Ser. No. 318,355
15 Claims. (Cl. 179—27)

This invention relates to switching systems and particularly to switching equipment for controlling the ordered sequence in which telephone calls are connected to operator positions for service. The present invention further relates to a telephone system having groups of calling circuits each of which is entitled to request selectively both non-priority and priority connections to operator positions. This invention relates more particularly to equipment which enables all priority requesting circuits in each of the groups to be connected to an individual one of the operator positions before any non-priority requesting circuit.

The advent of advanced mechanized procedures for serving person-to-person, coin, dial "0," and other special service telephone calls has in recent years increased both the speed and versatility of telephone communications to the extent that at present, or in the very near future, customers may dial and complete such calls with a minimal amount of operator assistance. Such mechanized procedures advantageously reduce the labor content of the operator's job and also provide for more convenient and efficient telephone service at less cost to customers.

In accordance with present day procedures for serving such calls, the customer dials either the called station number together with a prefixed special service code, for example, for a person-to-person or a coin call, or simply a zero (0) for a dial "0" call. The call is then automatically extended to an appropriate trunk circuit having access to an operator position. Upon receiving such a call, the trunk circuit requests a connection to an operator position on a non-priority (routine) basis and is connected thereto for enabling an operator to furnish the required assistance. After the needed assistance has been provided for the calling customer, the call is automatically completed to the called station and the operator position is disconnected from the calling circuit. In the event that the customer desires further assistance after the operator position has been disconnected and while the call is yet in progress, the trunk circuit may be activated, for example, by a switchhook flash to request connections to an operator position on a priority basis.

Non-priority service is requested by the trunk circuit when it initially receives a special service call because operator assistance is not required as quickly at that time as it is while the call is in progress. Priority connections to an operator position are requested by a trunk circuit while a call is in progress in order to serve customers with minimal delay and to reduce the holding time of the calling circuits.

The switching system disclosed in the A. H. Scheinman patent application, Ser. No. 318,360, filed concurrently herewith, provides for the connection of calling trunk circuits to operator positions on both non-priority and priority bases. In accordance with such a system, incoming trunk circuits of a tandem telephone office are segregated into trunk groups and each of the trunk circuits is provided with a pair of service requesting conductors. One of these conductors is used for requesting non-priority connections to an operator position when a call is initially received by the trunk circuit and the other is used for requesting connections to an operator position on a priority basis after the call is in progress. These trunk circuits are associated with position link connectors which together with a position link controller provides for the interconnection of the circuits with operator positions. The position link connector provides the actual interconnecting means and the link controller controls the ordered sequence in which non-priority and priority requesting trunk circuits are connected through those connectors to operator positions for service.

The link controller in such a system is designed to serve only one of the trunk groups at a time. It is activated by a position link connector upon the receipt of non-priority and priority requests to select a preferred one of the trunk groups associated with that connector and then to connect all priority requesting trunk circuits in all selected group to operator positions before any of the non-priority requesting trunk circuits in the same group.

Heretofore, the link controller has proceeded to select and effect the connection of each non-priority requesting circuit in the selected group to an operator position immediately after all of the priority requesting trunk circuits in the same group have been connected to an operator position. Thereafter, when all of the non-priority requesting circuits in the selected group have been connected to operator positions, the controller has selected another trunk group having trunk circuits requesting connections to an operator position, and proceeded to control the connection of all priority requesting trunk circuits in that group to operator positions before any non-priority requesting trunk circuit in the same group.

No facilities were heretofore available for the foregoing type of system for connecting all of the priority requesting trunk circuits in all trunk groups to operator positions before any non-priority requesting trunk circuit in the same groups. As a consequence, trunk circuits in less preferred trunk groups of such a system may at times request priority connections to operator positions concurrently with trunk circuits in a more preferred trunk group, which are requesting both non-priority and priority connections to the same positions, and the trunk circuits in the less preferred groups are required to wait for service for a considerable time while both the priority and non-priority requesting circuits of the more preferred group are being connected to the operator positions. It has proven undesirable under certain traffic conditions to serve priority requesting trunk circuits in this manner because these circuits are customarily serving calls which are already in progress at the time that the priority service is requested. Under such conditions, the completion of calls is delayed until after the operator assistance is provided and, furthermore, customers are occasionally required to wait a considerable time before the assistance is furnished.

It may be appreciated from the foregoing that a need exists for a means of providing prompt operator assistance while special service calls are in progress by enabling all priority requesting trunk circuits in all trunk groups of the system to be interconnected with operator positions before any non-priority requesting trunk circuit in the same groups.

Accordingly, it is a general object of my invention to provide prompt operator assistance on special service calls, and particularly when such assistance is requested while the calls are in progress.

Another object is to provide improved switching equipment for serving calling circuits requesting priority connections to operator positions.

These and other objects are attained in accordance with an exemplary embodiment of my invention wherein special service calls are received at a tandem telephone office by groups of incoming trunk circuits and are selectively connectable through the switching network of position link connectors to operator positions on both non-priority and priority bases. According to this exemplary embodiment, all priority requesting trunk circuits in all trunk groups are connectable to operator positions before any non-priority requesting trunk circuit in the same trunk groups.

As in the equipment disclosed in the cited Scheinman application, each of the trunk circuits in my illustrative embodiment is equipped with a pair of service requesting leads to a position link connector. One of these leads is used for presenting a request to the position link connector that connections be established on a non-priority basis through that position link to an available position. The second lead is used by the trunk circuit to present a request to the position link connector for connections to an operator position on a priority service basis.

Each position link comprises individual non-priority and priority registers for each trunk circuit in each trunk group for registering their requests. When non-priority and priority requests have been registered in these registers and operator positions are available to serve these requesting trunk circuits, the position link bids for and is connected to an idle position link controller. After being connected to the link controller, the position link informs that controller of the identity of the trunk groups which have trunk circuits requesting non-priority and priority connections to operator positions, and the controller registers the received trunk group identities in a trunk group registration circuit. Shortly afterwards, a trunk group "registration ended" circuit in the controller is activated to block temporarily the registration of the identity of any other trunk group in which a trunk circuit may subsequently request service while the controller is connected to the position link. This "registration ended" circuit insures that trunk groups are served on an equitable basis in the approximate order in which their trunk circuits present priority and non-priority connection requests.

The link controller also includes a trunk group selection circuit which is activated by the trunk group registration circuit for selecting for service all of the identified trunk groups which have at least one priority requesting trunk circuit, before any of the identified trunk group having only one or more non-priority requesting trunk circuits. After the selection of the most preferred one of the identified trunk groups, the link controller then controls the operation of the position link to effect the connection of each priority requesting trunk circuit in that group to an operator position before any non-priority requesting trunk circuit.

In contradistinction to the Scheinman equipment and in accordance with the present invention, after the last priority requesting trunk circuit in the most preferred trunk group has been connected to an operator position, it cooperates with the trunk group registration circuit to activate a "select next group circuit" in the link controller. The "select next group circuit," in turn, operates the trunk group selection circuit for selecting the next most preferred one of the identified trunk groups having at least one priority requesting trunk circuit. The link controller then controls the position link for effecting the connection of each priority requesting trunk circuit in the next most preferred trunk group to an operator position.

After the very last priority requesting trunk circuit has been connected to an operator position for service, it cooperates with the trunk group registration circuit to activate the "select next group circuit" which, in turn, operates the trunk group selection circuit for selecting a preferred one of the identified trunk groups having at least one non-priority requesting trunk circuit. The link controller thereafter controls the position link for effecting the connection of each non-priority requesting trunk circuit in this last selected trunk group to an operator position. All of the other identified trunk groups having non-priority requesting trunk circuits are thereafter successively served in a similar manner. When all priority and non-priority requesting trunk circuits have been connected to operator positions the link controller is disconnected from the position link.

The present invention also provides a priority calls waiting circuit in the link controller which enables it to recognize any of the trunk groups in which a trunk circuit presents a priority connection request after the trunk group "registration ended" circuit has blocked the further registration of other trunk group identities in the trunk group registration circuit. This priority calls waiting circuit is activated while the controller is controlling the interconnection of a non-priority requesting trunk circuit with an operator position, for causing the controller to finish interconnecting that trunk circuit with a position and then to disconnect itself from the position link and thereby to restore to its idle condition. The position link serving at least one priority requesting trunk circuit may then bid for and be connected to the idle controller for effecting the registration of the identity of each trunk group which then has a trunk circuits requesting priority and non-priority service. Each of the priority requesting trunk circuits in all of the identified trunk groups is then connected to an operator position before any non-priority requesting trunk circuit in a manner as previously explained.

A feature of my invention is the provision of groups of trunks each of which is entitled to connections to a plurality of operator positions on both routine and priority bases, a registration means responsive to the receipt of routine connection requests and priority connection requests from the trunks in each of at least two of the trunk groups for registering the requests, and facilities activated by the registration means for connecting each of the priority requesting trunks in each of the groups to one of the positions before any of the routine connection requesting trunks.

Another feature of this invention is the provision of a plurality of trunks each of which has means for requesting routine and priority connections to a plurality of operator positions, a register for registering routine connection requests received from any of the trunks, another register for registering priority connection requests received from any of the trunks, selecting means responsive to the registration of routine and priority connection requests in the registers for selecting all priority requesting trunks in each of the trunk groups for connection to any one of the positions before any one of the trunks having a registered routine connection request, and facilities activated by the selecting means for connecting each selected trunk to one of the positions in the order in which it is selected.

A further feature, directly related to the immediately preceding one, is the provision in the selecting means of circuitry responsive to the registration of routine and priority connection requests in the registers for initially selecting for service one of the groups of trunks having at least one priority request, and control circuitry for controlling the connecting facilities to connect successively each priority requesting trunk of the selected group to one of the positions; and the further provision of advancing circuitry which is activated immediately after the last priority requesting trunk in the selected group has been connected to one of the positions for advancing the selecting means to select for service another group of trunks having at least one registered priority request in one of the registers, and thereby to serve priority requesting trunks before any routine connection requesting trunk.

Yet another feature is the provision in the selecting means of circuitry activated immediately after the last priority requesting trunk in all the trunk groups has been connected to one of the positions for advancing the selecting means to select for service one of the trunk groups having a registered routine connection request.

Still another feature of the present invention is the provision of a trunk group registration circuit for registering the identity of each of the trunk groups requesting non-priority and priority connections to an operator position, a trunk group "registration ended" circuit for temporarily blocking the further registration of trunk group identities in the group registration circuit after a predetermined interval, and a priority request waiting circuit for recognizing any of the trunk groups in which a trunk circuit presents a priority connection request after the "registration ended" circuit has blocked the further registration in the trunk group registration circuit and for thereafter enabling the control circuitry to effect the connection of these priority requesting trunk circuits to operator positions before non-priority requesting trunk circuits in trunk groups which have already registered their identity in the trunk group registration circuit.

An advantage of my invention over the prior art is that groups of trunk circuits having means for requesting both non-priority and priority connections to operator positions may request priority connections to such positions and be connected thereto with minimum delay. The present invention minimizes delay because trunk circuits in each of the trunk groups, which are requesting priority connections to operator positions, are connected thereto before any non-priority requesting trunk circuit.

The foregoing objects, features, and advantages, as well as others, of my invention may become more apparent from a reading of the following description with reference to the drawing in which.

Figure 1:
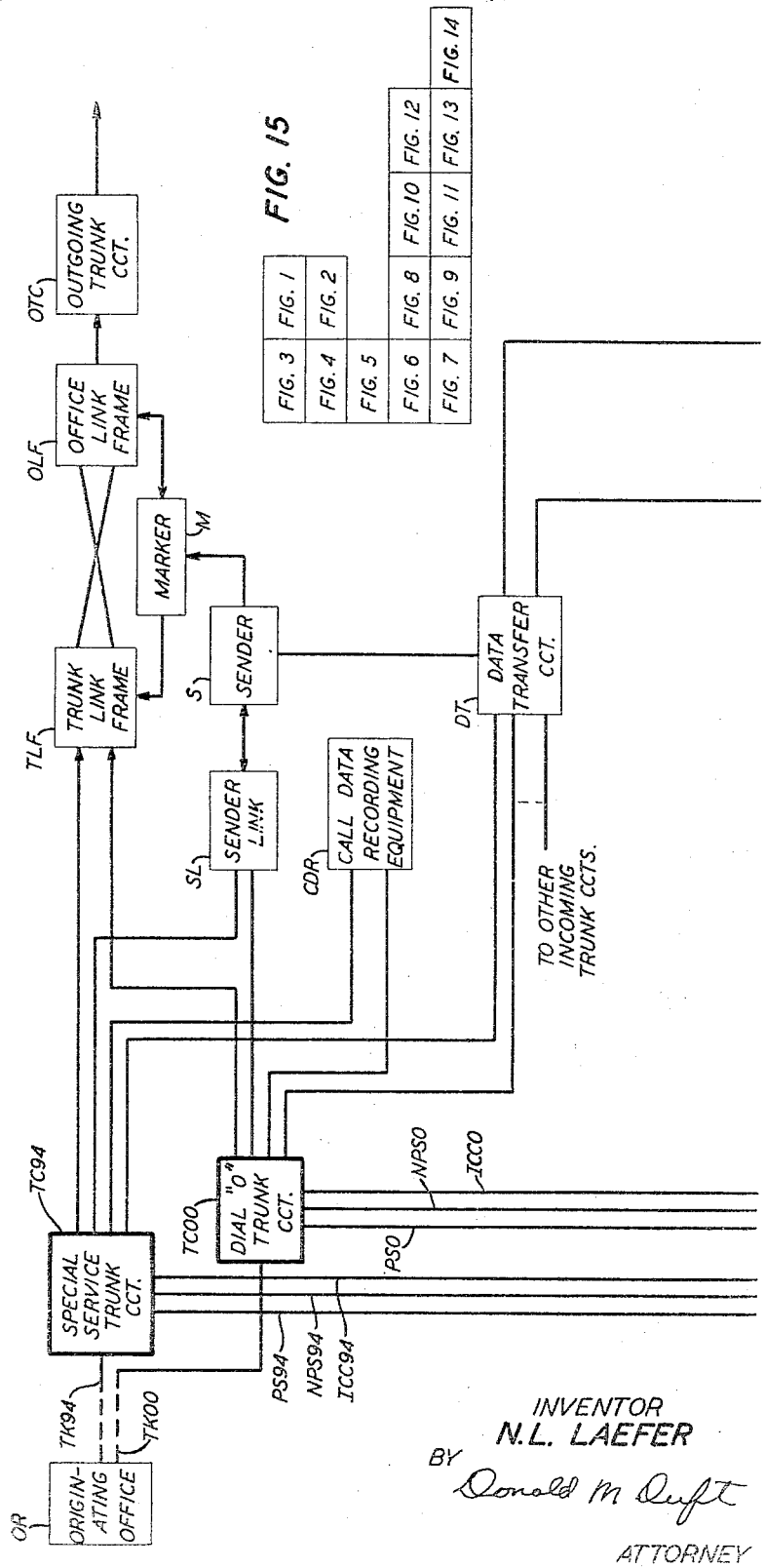
FIG. 1 shows, in block diagram form, the equipment of a tandem telephone system in which the equipment illustrative of the principles of the present invention has been embodied.

FIGS. 3–14 inclusive, show in block and schematic form the essential circuit details of an incoming dial "0" trunk circuit, a special service trunk circuit, a position link connector, a position link controller and a traffic regulator comprising the equipment utilized for connecting incoming calls to operator positions on both non-priority and priority bases; and FIG. 15 depicts the position in which FIGS. 1, 2 and 3–14 should be placed to show the cooperation among the equipment units.

It is noted that FIGS. 3–14 employ a type of schematic notation referred to as "detached contact" in which an "X" crossing a line represents a normally opened contact of a relay and a bar crossing a line represents a normally closed contact of a relay; "normally" referring to the unoperated condition of a relay. The principles of this type of notation are described in an article entitled "An Improved Detached-Contact Type Schematic Circuit Drawing" by F. T. Meyer in the September 1955 publication of the American Institute of Electric Engineers Transactions, Communications and Electronics, Vol. 74, pp. 505–513.

Each relay contact is designated in the drawing in a manner which indicates the relay of which it is a part and as well uniquely identifies it with respect to other contacts of the relay. For example, referring to relay contact M00–1 of FIG. 3, it is noted that the "M00" part of the designation indicates that it is controlled by the relay M00 of FIG. 3 and the "–1" uniquely identifies it with respect to the other contact M00–2 of relay M00, the latter contact being shown on FIG. 4.

Figure 10:
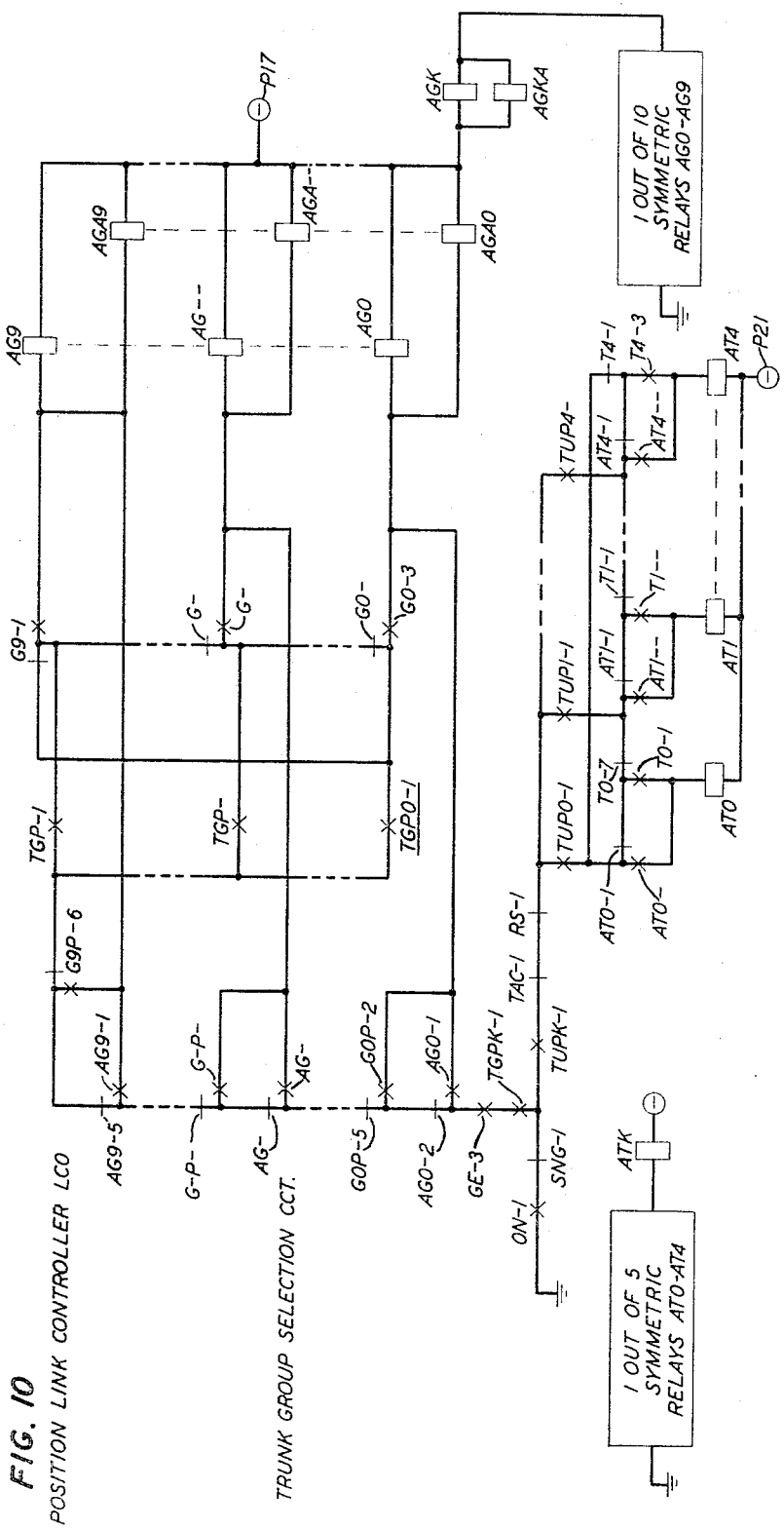

In the drawing, simplified schematic circuit patterns of relay contacts, which are known in the art as symmetrics, have been depicted in the drawing in block diagram form. According to such patterns, the contacts are arranged to furnish one output signal if a certain combination of relays is operated at the same time. For example, FIG. 10 shows two symmetrics disclosed in block diagram form. In the one symmetric associated with relay ATK of FIG. 10, a ground signal will be applied to the winding of relay ATK through the symmetric of contacts on the five relays AT0–AT4 of FIG. 10 if and only if one of the latter relays is operated. In the symmetric associated with the relays AGK and AGKA of FIG. 10, a ground signal will be applied to the windings of the latter relays if and only if one of the 10 relays AG0–AG9 of FIG. 10 is operated. The geometric configurations of the contacts in each of these blocks used in the present drawing are not shown for they are well known in the art. For details on the construction of such configurations, reference may be made to Keister, Ritchie and Washburn, "The Design of Switching Circuits" (5th ed., 1951).

The equipment of the present information may be advantageously incorporated in an automatic tandem telephone system wherein common control circuits are employed to control the establishment of calls through a switching network. One such system is disclosed in R. B. Curtis patent application, Serial No. 318,275, filed concurrently herewith. It is to be understood, however, that the present invention is not limited to use with a telephone system of this type, but that it may also be utilized with other types of switching systems, such as local or toll systems.

The equipment illustrative of the principles of the present invention has been embodied in a tandem telephone system of the type disclosed in the cited Curtis application (hereinafter referred to as the Curtis disclosure). It is particularly concerned with the apparatus in the dial "0" trunk circuits, the special service trunk circuits, the position link connector and position link controller circuits, as well as the other circuits shown in heavy lines on FIGS. 1 and 2. The other equipment units are neither shown nor described in detail herein, except where necessary, for a complete understanding of this invention. Structural details of the traffic regulator circuit of FIG. 2 are set forth in the C. E. Germanton patent application, Ser. No. 318,427, filed concurrently herewith. The cited Curtis and Germanton applications may be consulted for a complete understanding of the construction and operation of the units not covered in detail herein.

GENERAL DESCRIPTION

The general organization of the principal equipment units of the illustrative embodiment of my invention will now be described with reference to FIGS. 1 and 2. The crossbar tandem system as disclosed in the aforementioned Curtis disclosure is designed to serve several different classes-of-calls, such as dial "0" assistance calls and other special service calls, such as person-to-person and coin calls. These types of calls are extended to the tandem system from an originating office, such as office OR, via incoming trunks, such as the dial "0" and special service trunks TK00 and TK94. Each of the latter trunks is illustrative of the numerous trunks provided in a fully equipped tandem system for serving each of the different classes-of-calls. The trunks TK00 and TK94 are terminated individually in the incoming trunk circuits TC00 and TC94.

Each of the latter trunk circuits has five major appearances in the switching network of the tandem system. One appearance is on the trunk frame TLF and is used for establishing the talking connections between the calling and called stations. A second appearance is on the sender link SL and is used for passing information to and from the common control equipment, such as the sender S and marker M, of the system. Another appearance is in the call data recording equipment CDR and is used for recording the details required for charging for calls. A fourth appearance is in the data transfer circuit DT and is used for facilitating the interchange of data among the trunk circuits, common control circuits, and the position control circuits, such as circuit PCC. The fifth appearance is in the operator position link connector circuit, such as circuit PL0, and is used for connecting the trunk circuits to operator positions on non-priority and priority bases.

In this illustrative embodiment of my invention, the dial "0" and special service trunk circuits, such as circuits TC00–TC94, are segregated according to the class-of-calls which they serve. There are a maximum of ten groups in each position link connector. Each such group comprises only trunk circuits that serve the same class-of-call. There are five trunk circuits in each trunk group. This arrangement facilitates the control over the circuit operations involved in interconnecting the trunk circuits with operator positions and permits the circuits in each class-of-service group to be served on an equitable basis.

For requesting connections to the operator positions on non-priority and priority bases, each of the dial "0" and special service trunk circuits, such as circuits TC00–TC94, is equipped with non-priority and priority start leads, such as the leads NPS0–NPS94 and PS0–PS94, respectively. The trunk circuits may selectively request connections to the operator positions either on a non-priority (routine) basis or a priority basis by applying a service request signal to the appropriate non-priority or priority start lead.

It may be seen in FIG. 2 that the position link connector and the position link controller circuits, such as circuits PL0 and LC0, together provide the means for interconnecting the dial "0" and special service trunk circuits, such as circuits TC00–TC94, with operator positions, such as positions OP1 and OP66, via position control circuits and position circuits, such as the circuits PCC and PC. The position link connectors comprise the actual interconnecting means while the position link controller, as its name implies, controls the operations of a position link in such a fashion that all of the calling trunk circuits are interconnected with operator positions on an equitable basis.

The position link, such as link PL0, includes individual non-priority and priority registers, such as the registers NPR1–NPR10 and PR1–PR10 of FIG. 2, for each of the class-of-service trunk groups for registering non-priority and priority service requests received from the associated fifty trunk circuits. Non-priority requests are received from the dial "0" and special service trunk circuits over the leads NPS— and are applied to the non-priority registers, such as registers NPR1–NPR10, through the individual class-of-service gate circuits, such as the circuits CG1–CG10. Each of these gate circuits is controlled by a traffic regulator circuit TR in order to insure that the dial "0" and special service calls received by the incoming trunk circuits are served in the approximate order in which they are presented for service.

Priority service requests from dial "0" and special service trunk circuits are received over the priority start leads PS— and are registered in priority registers, such as the register PR1–PR10, independently of the gating system employed for the registration of non-priority requests. As a consequence, the latter registers are effective, as hereinafter explained, to activate a position link controller for allowing the priority requesting trunk circuits to be interconnected with operator positions before any of the non-priority requesting trunk circuits.

As is indicated in FIG. 2, each position link connector in the presently disclosed embodiment has a maximum of fifty trunk circuits connected to its input and 198 position loops connected to its output. Illustrative of the latter arrangement is the connection of the trunk circuits TC00–TC49 (fifty trunk circuits) to the input of the position link PL0 and the position loops L0–L197 to the output of link PL0. For connecting the trunk circuit information and control leads, such as the leads of the cables ICC0 and ICC94 of FIG. 2, the position loops, each position link employs a three-stage crossbar switch network comprising a primary, secondary and tertiary switching stage, such as the stages PRI, SEC and TER in the position link PL0 of FIG. 2. The linkages connecting the primary and secondary stages PRI and SEC are designated A links and the linkages connecting the secondary and tertiary stage SEC and TER are designated B links.

The position link connector circuit, such as circuit PL0, may be referred to for simplicity in the following description as position link PL0 or as link PL0. Accordingly, this terminology is used extensively throughout the remainder of the specification. The position links are arranged together into link groups, each of which comprises ten position links. An arrangement of the position links forming one such link group and the association of those links with incoming trunk circuits, position link controllers, operator positions, a traffic regulator and other control circuits is illustrated in FIG. 2.

Three link controllers are provided for each link group to control the ten position links. Preference and allotter circuits (not shown) are included in each of these link controllers to insure that equitable service is given to the incoming call traffic on each position link of a group as well as to insure that the incoming calls will be equitably distributed to the available positions. Each link controller comprises a trunk group selection circuit (not shown) for selecting each trunk group having at least one priority requesting trunk circuit before any trunk group having a trunk circuit requesting only nonpriority service. In addition, each link controller provides for selecting each priority requesting trunk circuit in a selected trunk group before any non-priority requesting trunk circuit in the same group. Each link controller also includes a "select next group circuit" (not shown in FIGS. 1 and 2 but shown schematically in FIG. 14) which provides for the connection of all priority requesting trunk circuits to the operator positions before any non-priority requesting trunk circuit. To do so, the "select next group circuit" is activated immediately after the last priority requesting trunk circuit in a selected trunk group has been connected to an operator position (that is, before any non-priority requesting trunk circuit in the selected group is served) for operating the trunk group selection circuit (not shown in FIGS. 1 and 2 but shown schematically in FIG. 10) to select for service another trunk group which has at least one priority requesting trunk circuit. The "select next group circuit" also is activated to advance the trunk group selected circuit to select for service a trunk group having at least one nonpriority requesting trunk circuit after the last priority requesting trunk circuit in all trunk groups has been connected to an operator position.

As is illustrated in FIG. 2, a group of 66 operator positions is connected to the ten position link PL0–PL9 of a link group via individual position circuits and position control circuits as well as the aforementioned 198 position loops. The latter loops are divided into 66 groups, each of which comprises three loops. A loop group, such as group LG1 comprising the loops L0–L2, is individually associated with one of the 66 position control circuits, such as circuit PCC. Thus, a link group serves to interconnect any one of 500 incoming trunk circuits with any one of 66 position control circuits via 198 position loops.

Each operator is provided with a position unit, such as unit PU1 of FIG. 2, which comprises a position control circuit and a position circuit. These circuits, together with the equipment at the operator position, provide three loop circuits whereby an operator may serve calls. A position control circuit, such as circuit PCC of FIG. 2, includes facilities for automatically conditioning each of the associated loops for connecting calls one-by-one through the position circuit to the operator position. The control circuit also comprises apparatus for enabling an operator to connect her telephone to any calling loop and to place a hold condition on any calling loop while she serves a call on another loop. A key-control position control circuit, such as circuit KCP of FIG. 2, is provided for each link group and is used for selectively preconditioning the control circuits of the position units, such as units PU1–PU66, for serving one of the different classes-of-calls receivable from the incoming trunk circuits.

The position control circuit PCC, the position circuit PC and the operator position OP1 are shown to comprise three different equipment units, rather than one, only because each of the three may be physically separated from the other two by varying distances depending upon the requirements of the office. However, for simplicity in discussion and ease of understanding, these three circuits may be generally referred to as the operator position circuit.

An operator can actively serve only one call at a time in this exemplary embodiment even though three loops, such as loops L0–L2, are provided. In addition, when an operator is actively serving a call on one loop, the position link appearances of the remaining two loops will appear busy and no calls will be offered to these loops at that time. Three loop circuits are provided for each position because, on some of the calls, the calling loop may be utilized for the entire duration of the call. Accordingly, if only one loop circuit was provided and it was utilized for serving such a call, the operator would be idle and would have no functions to perform for the duration of the call after she had completed the services required of her in connection with the establishment of that call. By providing the three position loops, a call can be offered to any idle loop while another loop in the same group is being utilized on another call for which the operator has completed the active servicing thereof. To facilitate the serving of such a call on the idle or unused loop, the position control circuit changes the busy condition on the position link appearances of the unused loops to an idle condition after the operator completes the active servicing of a call. Thus, the serving of the 198 position loop circuits by 66 operator positions enables a plurality of incoming calls to be extended to and served by a plurality of operators with a minimum of waiting time between calls.

A traffic regulator circuit, such as circuit TR of FIG. 2, regulates the equitable distribution of calls from all trunk groups in the same link group to the operator positions. The regulator controls the distribution by ascertaining the service demands by the various incoming trunk circuits as well as the availability of operator positions to serve these demands. It accomplishes the regulation by controlling the gate circuits, such as circuits CG1–CG10 of FIG. 2 associated with the non-priority registers in the position link, and by controlling the position availability signals which it supplies to those position links.

The regulator comprises facilities for controlling the gate circuits to admit service requests from a group of calling trunk circuits into the non-priority registers in the position link in order that the trunk circuits may be connected on a non-priority basis to the operator positions. After the requests have been admitted and registered, the regulator closes the gates in all ten position links controlled by the regulator to lock out from those links all other trunk circuits which are in the same class-of-service trunk groups as the circuits having already registered non-priority requests and which may subsequently request non-priority connections to operator positions. This insures that incoming calls requesting the same class-of-service are served in the approximate order in which they are received at the tandem office. After the closure of the latter class-of-service gates, the regulator allows non-priority service requests from trunk circuits in other class-of-service groups to be admitted and registered in the position links and these latter trunk circuits may compete for connections to the operator positions with the other trunk circuits which have previously registered non-priority service requests.

The traffic regulator also comprises circuitry which cooperates with all of the associated position links and link controllers to provide for the connection of trunk circuits to operator positions on a priority basis. When a trunk circuit requests priority service, the regulator circuitry is activated to make all operator positions appear busy to all position links which are not associated with a trunk circuit requesting priority service, while at the same time allowing the available positions to appear idle to the position link associated with the priority requesting trunk circuit. As a result, the priority requesting trunk circuit is connected through a position link to a available position before any trunk circuit requesting non-priority service, as hereinafter explained.

*Non-priority (routine) request*

Figure 2:
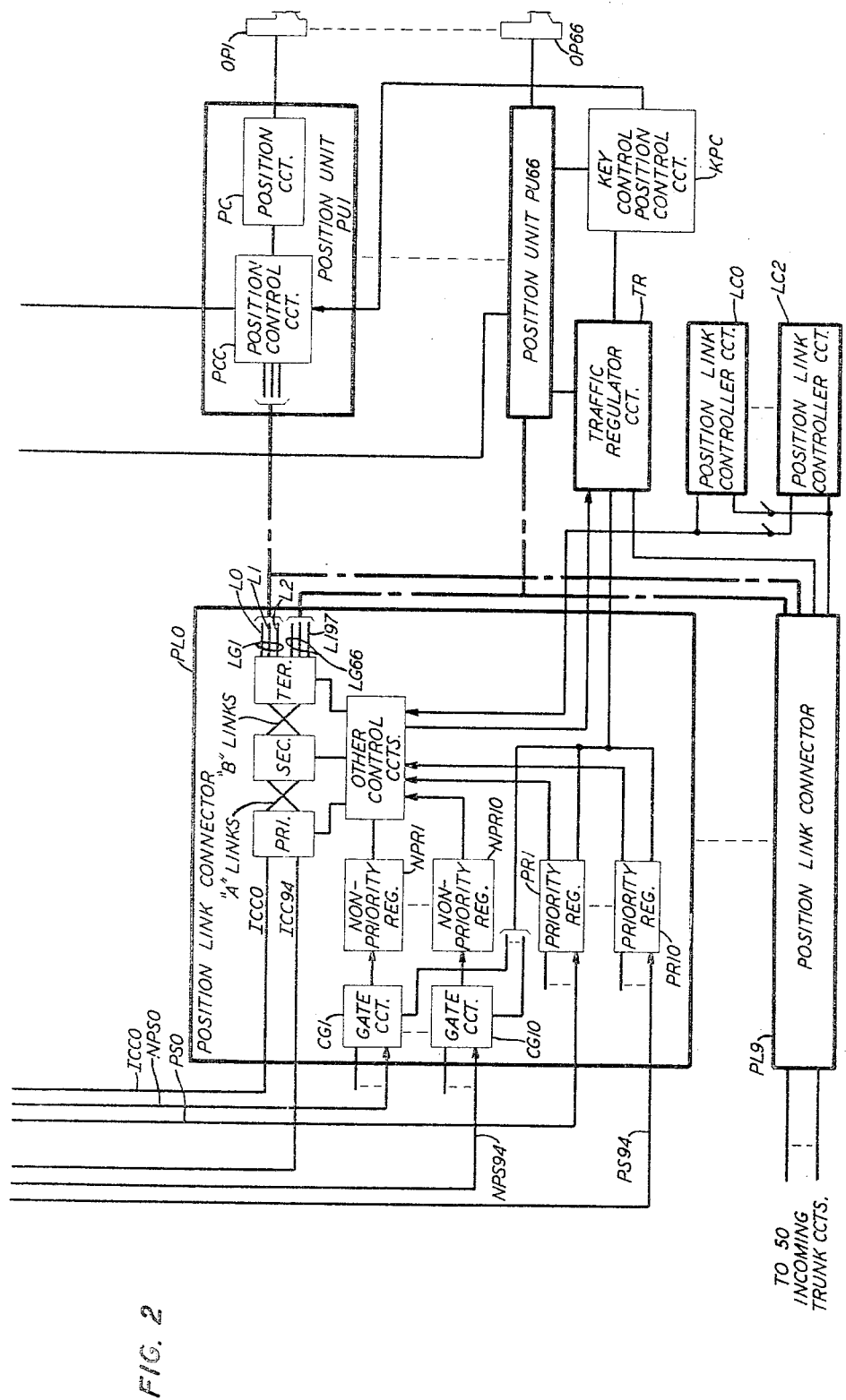
FIG. 2 is a block diagram depicting the equipment of the illustrative embodiment and comprises a group of ten position link connectors employed in the tandem telephone system for connecting 500 incoming trunk circuits to 66 operator positions through position control circuits and position circuits under control of three position link controllers and a traffic regulator.

Referring to FIGS. 1 and 2, a general description is now presented of the manner in which the incoming trunk circuits are connected through a position link to available operator positions on a non-priority basis. It is presently contemplated that each calling customer will dial a directing digit or code to enable the originating office OR to determine whether dial "0" operator assistance or special service is required on the call, and to route it to the tandem office over the appropriate one of the trunks, such as trunks TK00–TK94. The specific dialing routine employed for any of the calls depends upon a number of factors including whether or not a call may be completed on a customer-dialed basis to the called station.

For simplifying the description of the non-priority service features of the present invention, as well as the priority service features described in the next section, it is convenient to describe the manner in which a dial "0" call is served. This description will serve as well to explain the manner in which the other special service trunk circuits are connected to operator positions on non-priority and priority bases since the circuit operations are essentially the same for the dial "0" and special service trunk circuits. Additionally, let it be assumed that the call data recording is to be accomplished at the tandem office and that the originating office OR is not equipped for automatic calling number identification (ANI). As a result, such a call will be routed to an operator at the tandem office and she must orally obtain the calling station number from the caller. Such a call is referred to as a dial "0" non-ANI call in the aforementioned Curtis disclosure.

On a dial "0" call, this particular originating office OR recognizes from the dialing of the initial digit "0" that the called station digits will not be dialed by the calling party, and it immediately establishes connections to a trunk; for example trunk TK00, extending to the tandem office. The call is then received in the dial "0" trunk circuit TC00 which exclusively serves calls of this type and which immediately upon its seizure requests connections to an operator position on a non-priority basis by applying a service request signal to the non-priority start lead NPS0.

If no other dial "0" trunk circuit in the same link group as trunk circuit TC00 has previously requested, and is yet awaiting, connections to an operator position, the dial "0" class-of-service gate circuit CG1 of FIG. 2 in the position link PL0 admits the non-priority request from trunk circuit TC00 into the non-priority register NPR1 for registration. On the other hand, if another dial "0" trunk circuit in the same link group as circuit TC00 has previously registered a request in the register NPR1 and it has not been connected to an operator position, the gate circuit CG1 will have been activated by the traffic regulator TR of FIG. 2 to block the registration of the non-priority request from circuit TC00 until after the previously registered request has been served.

After the service request from trunk circuit TC00 has been admitted and registered, the other control circuits of the position link PL0 are activated to send class mark data to the traffic regulator TR for informing it that a dial "0" class-of-service has been requested. This data enables regulator TR to activate the class-of-service gate circuit CG1 and the other gate circuits, which correspond to the gate circuit CG1, in all ten position link connectors of the link group. When activated, these gates temporarily block the registration of non-priority service requests from all other dial "0" trunk circuits (not shown) which may subsequently request non-priority connections to operator positions while the trunk circuit TC00 is awaiting such connections. The blocking condition then persists until after the servicing of the request from trunk circuit TC00 and all of the non-priority requests which may have been simultaneously registered in the dial "0" non-priority registers for other dial "0" trunk circuits in the same link group. This gating system insures that the calls requesting the same class-of-service are served in the approximate order in which they are presented for service.

Before explaining further details of the manner in which the dial "0" call in trunk circuit TC00 is extended to an operator position, it is advisable to explain that the traffic regulator TR maintains a constant check on all 66 position control circuits, such as circuit PCC, to ascertain if operator positions are available to serve the different classes-of-calls. It may be recalled that the operator positions are selectively preconditioned for serving some or all of the classes-of-calls under control of the key-control position control circuit KCP. This checking operation provides for the efficient use of the associated three link controllers. The efficiency is achieved because the regulator TR, after it has checked the availability of the positions, sends position availability signals to all ten position links and accordingly allows each such link to seize one of the three controllers only if an operator is available to serve a call on a trunk circuit having a request registered to that link.

Thus, if a non-priority request from a first trunk circuit, such as a dial "0" trunk circuit, is registered in a first position link and the call on that circuit cannot be served due to the unavailability of an appropriate operator position to serve dial "0" calls, the regulator prevents that position link from seizing an idle link controller until after an appropriate position becomes available. On the other hand, however, if a second trunk circuit request, such as a request from a special service trunk circuit, is thereafter registered in a second position link in the same link group and a position is available to serve the call on that trunk circuit but not the call on the first dial "0" trunk circuit, the regulator TR allows the second, but not the first, position link to seize an idle link controller. This mode of operation prevents the unnecessary tie-up of the link controllers by trunk circuits which cannot be served. In addition, it increases the speed of establishing connections and insures that calls are served quickly when there are operator positions available to serve them.

Returning now to the description of the manner in which the trunk circuit TC00 is connected to an operator position on a non-priority basis, it is noted that when the regulator TR informs the position link PL0 that at least one position is available to serve the call on trunk circuit TC00, the link PL0 seizes an idle link controller, for example controller LC0, and transfers to it the identity of trunk circuit TC00 together with all other trunk circuits on that link which are currently requesting connections on a non-priority basis to available operator positions. Controller LC0 then selects the most preferred class-of-service trunk group from among those requesting the non-priority service and then selects the most preferred calling trunk circuit, for example circuit TC00, within the selected group for connections to an available position. It should be kept in mind at this point that, in making the trunk group selection, no priority service requests are in the system at that time. Thereafter, the controller LC0 informs the position link PL0 that trunk circuit TC00 is to be served. In return, that link transmits back to the controller LC0 a dial "0" class-of-service indication for trunk circuit TC00 for enabling the controller LC0 to initiate the selection of an appropriate operator to serve the call.

After selecting an available operator position, for example position OP1, controller LC0 scans all possible communication channels through the primary, secondary and tertiary switching stages PRI, SEC and TER and A and B links of the position link PL0 to find an idle channel capable of interconnecting trunk circuit TC00 with an idle one of the three loops to position OP1. When an idle channel has been found, controller LC0 activates the stages PRI, SEC and TER to interconnect trunk circuit TC00 and a position loop circuit through the position control circuit PCC and position circuit PC to position OP1. Controller LC0 then releases. At the same time, the position control circuit PCC seizes the data transfer circuit DT, which then interconnects the trunk circuit TC00 with control circuit PCC in order that circuit TC00 may transmit class mark information to circuit PCC. Shortly afterwards, the data transfer circuit releases. The established connections are thereafter held under the control of the control circuit PCC.

Following the interconnection of trunk circuit TC00 and control circuit PCC, the operator telephone (not shown) is operatively associated with the call connections and a tone signal is sent from circuit PCC to that telephone for alerting the operator to the call. At the same time, indicator lamps (not shown) are lit at the position to notify the operator of the class-of-call to be served and the identity of the loop engaged for that call. The operator may now orally request from the calling party both the calling and called station numbers and key both of these numbers into registers (not shown) at her position. She then depresses a position key (not shown) which causes the trunk circuit TC00 to seize a sender, for example sender S, through the sender link SL. The depressed position key (not shown) also causes the data transfer circuit DT to interconnect the trunk circuit TC00 the position OP1 and the sender S in order that the calling and called numbers and other information registered in the position control circuit PCC may be transmitted to the sender S of FIG. 1.

In response to the successful receipt of the call information in the sender S, the data transfer circuit DT is released. At the same time, sender S seizes a marker, such as marker M, via the marker connector MC, and transmits to marker M the information it needs to extend call connections from trunk circuit TC00. Marker M selects an idle outgoing trunk circuit, for example circuit OTC, extending to the called destination and then selects and closes connections between trunk circuits TC00 and OTC via the trunk link and office link frames TLF and OLF. Once the latter connections are established, marker M releases and sender S outpulses to the next telephone office the information required by that office to complete the call. The sender S then releases, thereby leaving the connections within the tandem office under control of the trunk circuit TC00.

While the last mentioned circuit operations are in progress, the operator may depress a key at her position to initiate the recording of the proper call charges in the call data recording equipment CDR in a manner discussed in the Curtis disclosure and then to release the loop circuit connecting her position to the call connections. Upon the release of this loop circuit, another call may be connected thereto in a manner as described in the foregoing paragraphs. As a result of releasing the loop circuit, that circuit is not tied up during the periods when operator assistance is not required by the customer and the operator is free to utilize these facilities to serve another call while the just-served call is in progress. In the event that the customer involved on the latter call again requires assistance, she may recall the same or another operator and be connected to the latter operator's position on a priority basis.

*Priority request*

After the call connections have been established through the trunk circuit TC00 to the called station, the calling party again may request operator assistance by momentarily depressing the telephone switchhook, or button, to send a transient on-hook signal to circuit TC00. The latter circuit then requests connections to an operator on a priority basis by applying a signal to the priority start lead PS0 of FIG. 1. This priority request signal is sent to the position link PL0 and is registered in the dial "0" priority register PR1 independently of the gating system used for the previously described non-priority service. After the priority request has been registered, the other control circuits of the position link PL0 activate the traffic regulator TR which then makes all operator positions appear busy to the position links in the same link group that are not engaged in serving priority requests. Consequently, none of the latter position links can seize a position link controller for serving a non-priority request until after all of the priority requesting trunk circuits have been connected to operator positions. In addition, regulator TR activates the control gates for the non-priority registers associated with the dial "0" trunk circuits on all position links PL0–PL9 to block the subsequent registration of non-priority requests from these circuits until after the priority requesting trunk circuit TC00 has been interconnected with an operator position.

When there is a position available to serve a priority request, the regulator TR enables a preferred one of the position links having a registered priority request to seize an available position link controller. On the other hand, however, if all three controllers, LC0–LC2 are in the process of completing connections between incoming trunk circuits and operator positions at the time that the priority request is presented by trunk circuit TC00, the regulator TR informs the controllers LC0–LC2 that a priority request is awaiting service. Each of the controllers then completes the connections through the position link for the request which it is in the process of serving and, if no priority request has been registered in that position link, then releases itself from that link.

Once a position link controller, for example controller LC0, becomes available to serve a priority request in another position link, it is connected to that link, for example link PL0, and then selects the most preferred trunk group requesting priority service on link PL0 as well as the most preferred trunk circuit, for example circuit TC00, within the selected group for connections to an operator position. Thereafter, the controller informs the position link PL0 that trunk circuit TC00 is to be served. Link PL0 thereupon returns a dial "0" class-of-service indication for trunk circuit TC00 for enabling the controller LC0 to initiate the selection of an appropriate operator position to serve the call.

After an available position, for example position OP66, has been selected, controller LC0 finds and establishes a communication channel through the switching stages PRI, SEC and TER and the A and B links of position link PL0 to an idle position loop extending to the position control circuit (not shown) of position unit PU66. Meanwhile, the position control circuit is activated to seize the data transfer circuit DT which then interconnects the trunk circuit TC00 and the position control circuit (not shown) of the position unit PU66 in order that circuit TC00 may transmit to that control circuit (not shown) the class mark information and other signals indicating that the calling party is recalling for operator assistance. The data transfer circuit DT is then released.

After the trunk circuit TC00 has been connected to position unit PU66, the controller LC0 is either disconnected from position link PL0, or, under a number of conditions, remains connected to the link PL0 for serving other trunk circuits terminated thereon which are requesting connections to the operator positions. These other trunk circuits are served in essentially the same manner as trunk circuit TC00. One of these conditions is when another trunk circuit in the same trunk group as circuit TC00 has been requesting priority service concurrently with circuit TC00. Another condition occurs when at least one trunk circuit in another trunk group served by position link PL0 is requesting priority service. Yet another condition occurs when there is no other trunk circuit in the same link group which is requesting priority service but there is at least one non-priority requesting circuit in a trunk group served by position link PL0.

In order to serve trunk circuits associated with link PL0 under the foregoing conditions, controller LC0 comprises a trunk group selection circuit for successively selecting for service each trunk group having at least one priority requesting trunk circuit before any trunk group having only non-priority requesting circuits, and circuitry for selecting each priority requesting trunk circuit in the selected group for connection to an operator position before any non-priority requesting trunk circuit in the same group. Controller LC0 also includes a "select next group circuit" which provides for the connection of all priority requesting trunk circuits to the operator positions before any non-priority requesting trunk circuit. In providing this feature, the "select next group circuit" is activated after the last priority requesting trunk circuit in a selected group has been connected to an operator position for operating the trunk group selection circuit to select another trunk group which is served by link PL0 and has at least one priority requesting trunk circuit. If there is no such circuit on any of the links PL0–PL9 when the "select next group" circuit is activated, the trunk group selection circuit selects a trunk group on link PL0 having a non-priority requesting trunk circuit. In the event that there is no trunk circuit requesting non-priority service, controller LC0 is released.

Returning now to the description relative to trunk circuit TC00, connected with the position control circuit (not shown) of unit PU66, the operator telephone (not shown) is operatively associated with the call connections and, a tone signal is sent to that telephone for alerting the operator to the call. Meanwhile, an indicator lamp at position OP66 is lighted at a flashing rate to inform the operator that the calling party is recalling for operator assistance on a designated one of the position loops. The operator may then proceed to converse with the caller and furnish the requested service. When this service has been provided, the operator depresses a key (not shown) to cause the release of the channel through the position link PL0, position control circuit and the position circuit of unit PU66, and thereby cause the disconnection of position OP66 from the call connections. Supervision over the call connections in the tandem office is thereafter retained by trunk circuit TC00 until the termination of the call.

If for some reason operator assistance is subsequently required at any time during the call, the customer may again recall for an operator in a manner as just described and be connected on a priority basis to an operator position.

In summary of the foregoing description, it may be emphasized that the equipment of this exemplary embodiment enables a single trunk circuit to request connections to operator positions on both priority and non-priority bases. Furthermore, the exemplary equipment enables a trunk to be connected to an operator position on a non-priority basis when the trunk first receives an incoming call, to be disconnected from that position during periods of the call when operator assistance is not required and to be subsequently reconnected to the same or another operator position on a priority basis at any time during the call when operator assistance again is required. Moreover, the exemplary embodiment enables all priority requesting trunk circuits to be connected to operator positions before any non-priority requesting trunk circuit. In addition, the equipment permits a small number of operator position loops to serve a plurality of different classes-of-calls with increased speed and efficiency as well as without unnecessary tie-up of the loop circuits during periods of calls when operator assistance is not required.

DETAILED DESCRIPTION

Referring now to FIGS. 3–13, a detailed description will be presented of the circuit operations involved in providing incoming trunk circuits with connections to operator positions on non-priority and priority service bases. The description is directed only to those circuit details necessary for a clear understanding of the present invention. Other circuit details necessary to integrate the present invention into an operating tandem telephone system are disclosed in the aforementioned Curtis disclosure. Accordingly, only certain of the structural details of the dial "0" and special service trunk circuits, position link connector, position link controller, and the traffic regulator are shown in FIGS. 3–13.

Included in the operate paths of a number of relays disclosed in FIGS. 3–13 are contacts of relays whose operating windings are not shown in these figures in order to simplify the drawing. For example, the winding for the relays GDPB and GDNA are not shown in the drawing but their contacts are shown on such FIGURES as 13 and 14 as GDPB–1 and GDNA–9 and the like. These relay windings and others that are not shown herein, are disclosed in the Curtis disclosure.

In the preceding general description, it was mentioned that incoming dial "0" and special service trunk circuits are segregated in the position link connectors according to their class-of-service. These trunk circuits are grouped together on the position link into groups called pentads, each of which comprises five trunk circuits, all of which serve the same class-of-calls. Illustrative of such a trunk circuit grouping is the grouping of the dial "0" trunk circuits TC00–TC04 and the special service trunk circuits TC90–TC94 in FIG. 3. Each position link comprises ten such trunk circuit groups and thereby provides for the termination of 50 incoming trunk circuits.

Each designation of a trunk circuit includes a number comprising a digit indicating the trunk circuit group into which it has been placed and a digit which uniquely identifies it within that group. To illustrate, the designation of trunk circuit TC00 includes the number $\underline{00}$ which comprises the first digit $\underline{0}$ to indicate the trunk circuit group 0 and the last digit $\underline{0}$ to identify the trunk circuit within the group 0. Similarly, the designation of trunk circuit TC94 includes the number 94 wherein the digit 9 indicates that the trunk circuit has been placed in the last trunk circuit group 9 on the position link PL0 and the digit 4 identifies the circuit within group 9.

This detailed description will now commence at the point where a trunk circuit requests non-priority connections to an operator position. For a detailed description of the circuit operations which precede the trunk circuit request for non-priority connections to an operator position, reference may be made to the aforementioned Curtis disclosure. For simplifying the description of the non-priority and priority service features of the present invention, it is deemed convenient to describe the manner in which the dial "0" trunk circuit TC00 requests non-priority and priority connections to an operator position.

Registering a non-priority request

When trunk circuit TC00 receives a call from the originating office OR of FIG. 1, it immediately activates the position request relay PR (not shown) in a manner as disclosed in the Curtis disclosure to indicate that an operator is required to service the call. Upon operating, the relay PR activates its contact PR–1 of FIG. 3 to apply ground potential through contact D–1 to the non-priority start lead NPS0 and thereby present the non-priority request to the position link PL0. If no other "0" trunk circuit in the same link group as trunk circuit TC00 has previously requested, and is yet awaiting, connections to an operator position, the gate relay G0 of FIG. 5 in the dial "0" class-of-service gate circuit CG1 will be in its unoperated condition to enable the ground on lead NPS0 of FIG. 3 to be extended through contact G0–1 and the winding of relay M00 in the non-priority register NPR1 to the negative potential P1 for operating relay M00 and thereby registering the non-priority request. When relay M00 is operated, it completes a locking path for itself through its contact M00–1 to the ground on lead NPS0 to insure that relay M00 remains operated after the gate relay G0 is operated as hereinafter explained.

On the other hand, if another dial "0" trunk circuit in the same link group as circuit TC00 has previously registered a request in a non-priority register and that other trunk circuit has not been connected to an operator position, the gate relay G0 will be operated, as hereinafter explained, to open all of its contacts, such as contact G0–1. As a consequence, these contacts remain open to block the registration of the non-priority request from circuit TC00 and all non-priority requests subsequently received from other dial "0" trunk circuits in the same link group until after the previously registered request has been served.

Figure 3:
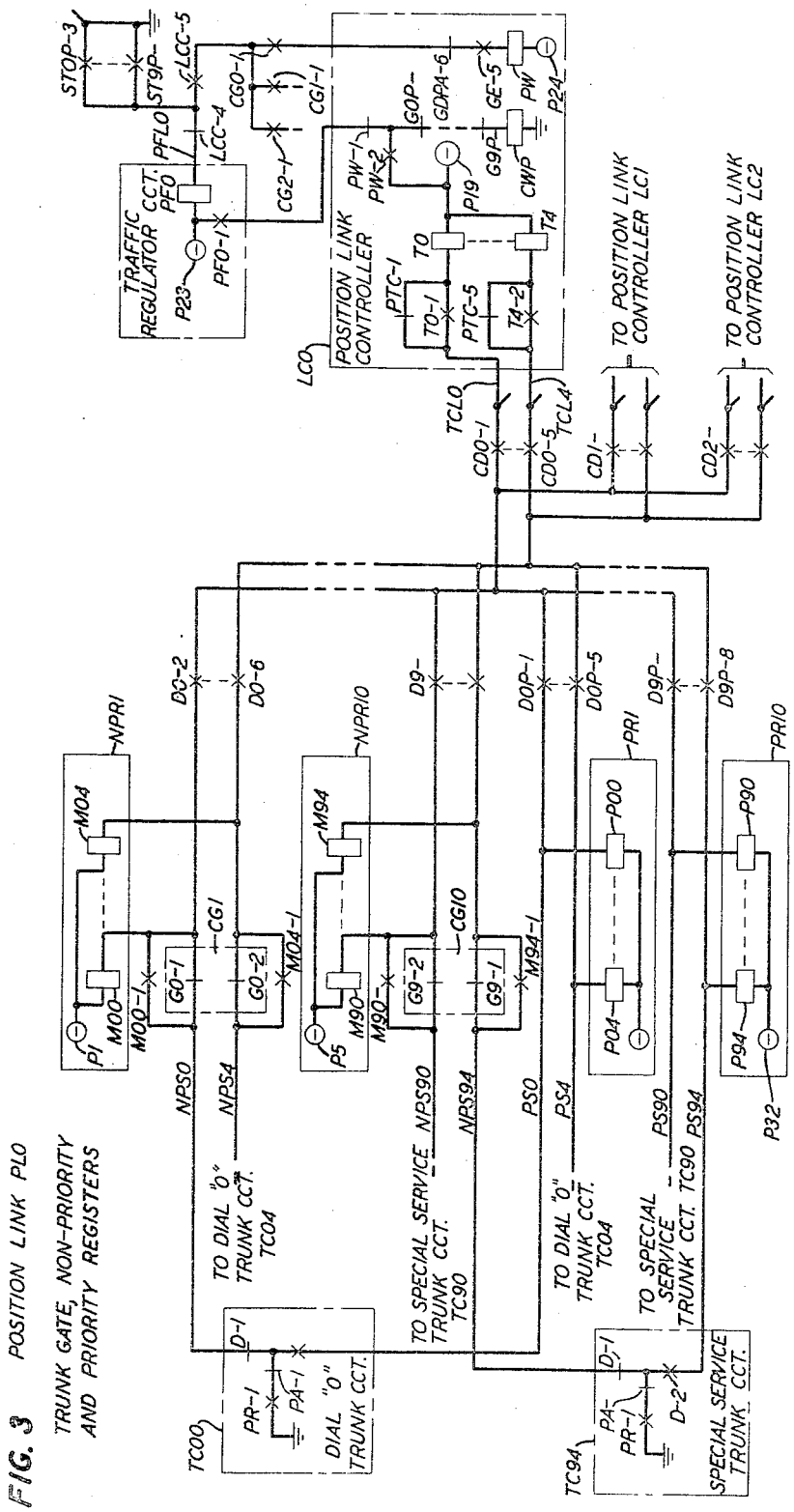
Figure 4:
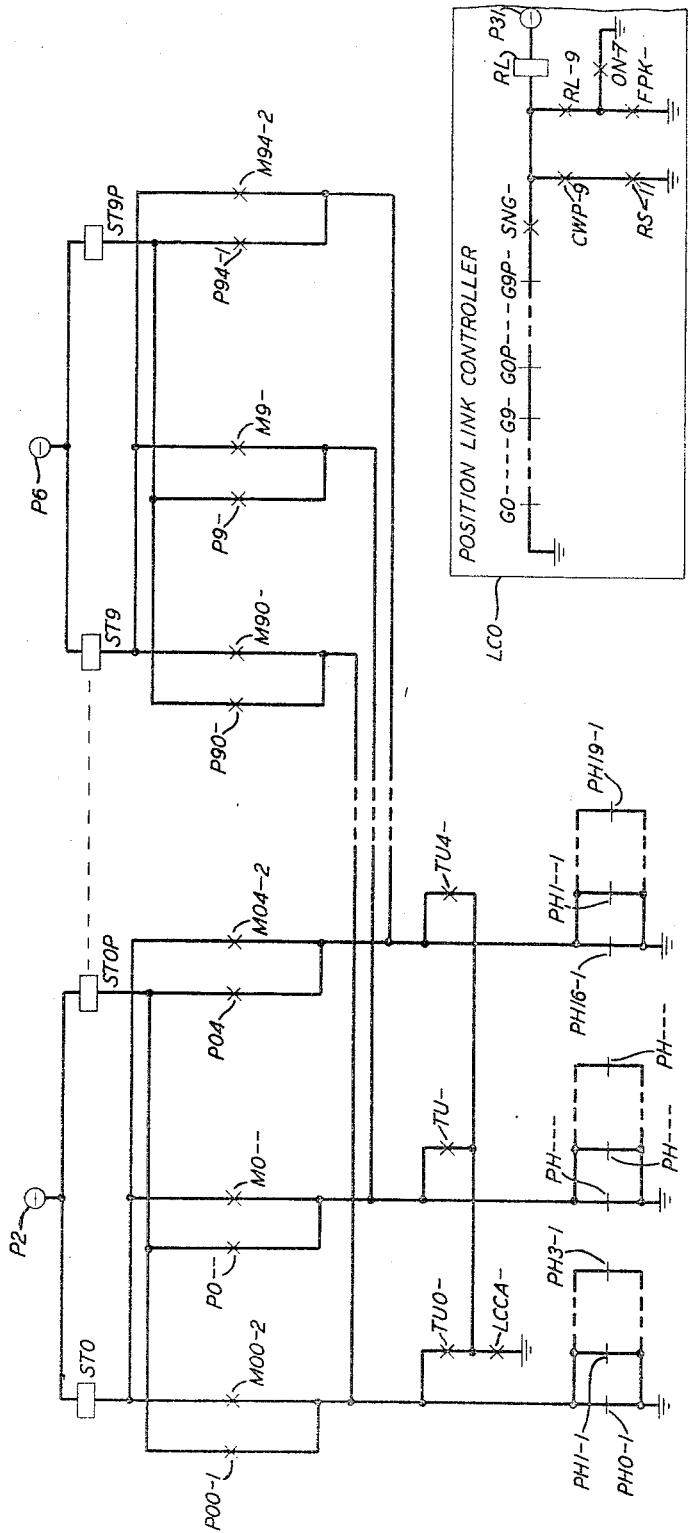

After relay M00 has been operated, if there is at least one path available for connecting trunk circuit TC00 through the primary switching stage PRI of FIG. 1 and an "A" link to the secondary switching stage SEC, at least one of the crossbar switch hold magnets PH0–PH3 (not shown) associated with the circuit TC00 will be in the unoperated condition and one of the associated hold magnet off-normal contacts PH0–1 through PH3–1 of FIG. 4 will be closed in a manner disclosed in the aforementioned Curtis disclosure. As a consequence, upon the operation of relay M00 of FIG. 3, a circuit path is completed in FIG. 4 for operating the non-priority start relay ST0 and thereby identifying and storing the trunk group 0 identity as having a trunk with a registered non-priority request. This path is from the negative potential P2 through the winding of relay ST0, contact M00–2, and at least one hold magnet off-normal contact PH— to ground.

Figure 5:
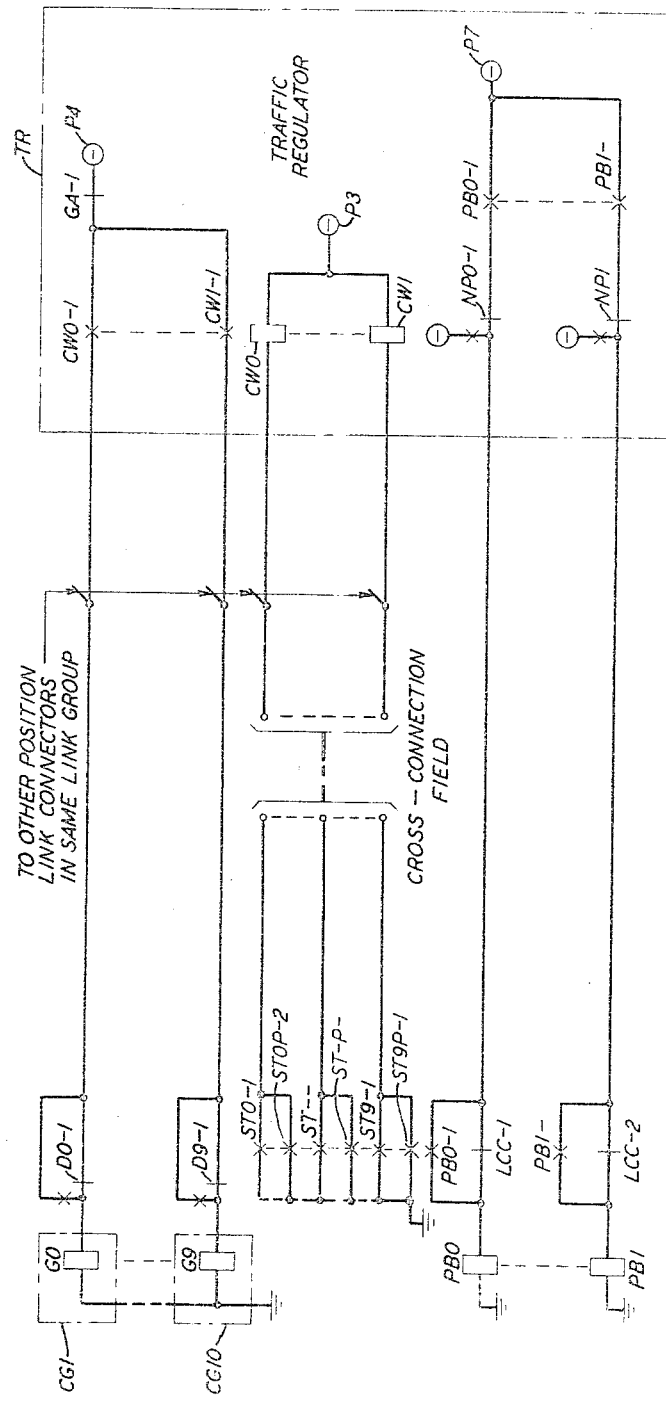

Following the operation of relay ST0, a path is completed for operating the calls-waiting relay CW0 in the traffic regulator TR of FIG. 5 to indicate that dial "0" calls are awaiting service. The path is from ground through contact TS0–1, a cross-connection field and the winding of relay CW0 to the negative potential P3. Upon operating relay CW0 activates the gate relays G0, such as relay G0 of FIG. 5, in the dial "0" class-of-service gate circuits CG1 in all position links over the paths in parallel from ground through the windings of the relays G0 and the contacts D0–1, CW0–1 and GA–1 to the negative potential P4. In the present embodiment, it is assumed that dial "0" trunks appear in trunk group 0 on each of the position links PL0–PL9. This assumption, however, may be varied to suit the traffic requirements of each office and to equalize wear of the switching equipment. As a result of the operations of the relays G0 in all position links in the same link group, the contacts of these G0 relays are opened to prevent the registration of any subsequent request for non-priority service from dial "0" trunk circuits on any position link in this link group until all of the presently registered dial "0" non-priority requests have been served.

Before describing the other circuit operations that occur in connection with the call on trunk circuit TC00, it is advisable to explain that the special service trunk circuits served by the link group serving trunk circuit TC00 may effect the registration of non-priority requests at this time. For example, the trunk circuit TC94 of FIG. 3, upon receiving an incoming call, will operate its position request relay PR (not shown) to initiate the registration of a non-priority request in the special service non-priority register NPR9 of FIG. 3. When the latter relay (not shown) is operated, ground is applied through contacts PR–1 of trunk circuit TC94 to the non-priority start lead NPS94. If no other special service trunk circuit in the same link group as circuit TC94 has previously requested, and is yet awaiting, connections to an operator position, the special service class-of-service gate circuit CG10 in the position link PL0 will be in its unoperated condition for enabling the ground on lead NPS94 to be extended through contact G9–1 and the winding of relay M94 to the negative potential P5 for operating the relay M94 and thereby registering the non-priority request. Upon operating, relay M94 locks through contact M94–1 to the ground on lead NPS94. On the other hand, if another special service trunk circuit in the same link group as circuit TC94 has previously registered a request in the register NPR9 and it has not been connected to an operator position, the gate relay G9 of FIG. 5 will have been operated at the time the non-priority request from trunk circuit TC94 is received, to open contact G9–1 and thereby block the registration of the non-priority request from circuit TC94.

Following the operation of relay M94, if there is a path available for interconnecting the trunk circuit TC94 with the secondary switching stage SEC via the primary switching stage PRI and an A link of FIG. 1, the primary stage crossbar switch hold magnets PH16–PH19 (not shown) will be in their unoperated condition and the associated off-normal contacts PH16–1 through PH19–1 will be closed as described in the Curtis disclosure. Accordingly, upon operation of relay M94, a path will be completed in FIG. 4 for operating the non-priority start relay ST9. The path is from the negative potential P6 through the winding of relay ST9, contact M94–2 and at least one of the off-normal contacts PH16–1 through PH19–1 to ground. The operation of relay ST9 completes a path for operating the calls-waiting relay CW1 in the traffic regulator TR of FIG. 5 to indicate that there are special service calls awaiting service. Relay CW1 is operated over the path extending from potential P3 through the winding of relay CW1, a cross-connection field and contact ST9–1 to ground.

When relay CW1 is operated, it in turn operates all of the special class-of-service gate relays, such as relays G9 of FIG. 5, in all position links in the same link group in order to block out all subsequently received non-priority requests from special service trunk circuits until the admitted and registered requests have been served. The registration of non-priority requests from special service trunk circuits is blocked when the gate relays G9 activate their associated contacts, such as contact G9–2 of FIG. 3. The G9 relays are activated over a path extending from the negative potential P4 of FIG. 5 through the contacts GA–1 and CW1–1 and thence through the contacts D9–1 and the winding of relays G9 of all position link connectors to ground.

*Position link seizes position link controller*

Returning now to the call on trunk circuit TC00, it is noted that after the non-priority request from circuit TC00 has been registered in a non-priority register NPR1 of FIG. 3, the position link PL0 will proceed to seize an idle one of the three associated position link controllers LC0–LC2, provided that there is an operator position available to serve a dial "0" call. Before describing the manner in which the link PL0 seizes a link controller, it is advantageous to describe the manner in which the position links are informed whether or not there are available positions to serve each of the classes-of-calls, and then the mode of operation of the controller preference and start circuits of FIG. 6.

As mentioned previously in connection with the general description, the traffic regulator TR maintains a constant check on all positions to determine whether there are positions available to serve each of the different classes-of-calls. It may be recalled that operator positions are selectively preconditioned for serving some or all of the different classes-of-calls under control of the key-control position control circuit KCP of FIG. 2. If there are no positions available to serve a particular class-of-call, such as a dial "0" call, regulator TR will operate the all dial "0" positions busy relays PB0, such as relay PB0 of FIG. 5, in all of the ten associated position links to indicate to those links that no position is available to serve that particular class-of-call and to prevent those links from seizing a position link controller until a position becomes available to serve that class-of-call.

When all of the positions preconditioned to serve a particular class-of-call, for example dial "0" calls, are busy serving other calls, signals are sent as disclosed in the cited Curtis disclosure from the key-control position control circuit KCP of FIG. 2 to activate a corresponding all positions busy relay, such as relay PB0 (not shown) in regulator TR. After that relay has been activated, it in turn activates the corresponding all positions busy relays in all ten associated position links to indicate that an operator position is not available to serve that particular class-of-call. For example, when no positions are available to serve dial "0" calls, the all positions busy relay PB0 in the position link PL0 of FIG. 5 is activated over the path extending from ground through the winding of PB0 and contact LCC–1 in the position link PL0 and the contacts NP0–1 and PB0–1 in the regulator TR to the negative potential P7.

A traffic regulator can only operate the all positions busy relays in a position link when that link is not connected to a link controller because during the time that a position link is connected to a controller the LCC relay in that link will be activated, as hereinafter explained, and will open all of the operating paths for the PB— relays. For example, the operating paths for the PB0 and PB1 relays in the position link PL0 of FIG. 5 are opened at contacts LCC–1 and LCC–2 while the link PL0 is connected to any one of the controllers LC0–LC2. After a PB— relay, such as relay PB0, has been operated by the regulator TR, it completes a locking path for itself through its contact PB0–1 to potential P7 supplied from the regulator and thereby remains operated as long as positions are unavailable to serve dial "0" classes-of-calls.

The controller preference circuit of FIG. 6 comprises a WXZ sequence circuit which is sequentially stepped at the end of each controller usage by the link PL0 for preparing that link for preferring a different controller on the next seizure of a controller by link PL0. At the time that the power is first applied to the position link, the initial starting circuit IS of FIG. 6 supplies a momentary ground to the start preference lead SP for completing a circuit through the winding of relay CCP to the negative potential P8 and thereby operating relay CCP. The initial operation of relay CCP completes an operating path for relay W of FIG. 6 from the potential P8 through the winding of relay W and the contacts Z–1, W–1, X–1 and CCP–1 to ground. Upon operating, relay W completes a locking path for itself through contacts Z–1 and W–2 to ground.

Shortly thereafter, the momentary ground on lead SP is removed to effect the release of relay CCP. When released, relay CCP opens contact CCP–1 and closes contact CCP–2 to complete an operating path for relay X of FIG. 6. The latter path extends from the potential P8 through the winding of relay X and the contacts Z–2, W–3, X–2 and CCP–2 to ground. Operated relay X closes a locking path for itself through contacts Z–2, W–3 and X–3 to ground. The operated relays W and X are now conditioned for allowing selection of one of the three associated position link controllers LC0–LC2 as hereinafter explained.

Returning now to the previous description concerned with seizing a position link controller for connecting the trunk circuit TC00 to an operator position on a non-priority basis, it will be recalled that relay ST0 of FIG. 4 was operated under control of relay M00 of FIG. 3 after the non-priority request from trunk circuit TC00 was registered. Following the operation of ST0, a path is completed in FIG. 6 for operating the controller start auxiliary relay CSA, provided that an operator position is available for serving dial "0" calls as signified by the release condition of relay PB0 of FIG. 5. This path extends from the negative potential P9 through the winding of relay CSA and the contacts RL-1, Z-3, X-4, W-4 and ST0-1, a cross-connection field and contact PB0-2 to ground. The operation of relay CSA initiates the selection of the most preferred idle one of the link controllers LC0-LC2.

The link controller most preferred by the position link PL0 is determined by the WXZ preference circuit of FIG. 6. At this point, it may be assumed that the relays W and X have been operated as previously explained. Accordingly, the position link PL0 will prefer the link controller LC1 and, when relay CSA of FIG. 6 is operated, it will complete a path for activating the start circuit (not shown) in controller LC1 provided that controller is not busy serving another position link. The latter path is from the negative potential P10 of FIG. 6 through the resistor R1, contacts CSA-2, X-7, W-7 and CBT1-1 to the start circuit (not shown) of controller LC1. However, if the controller LC1 is busy, the controller busy test relay CBT1 of FIG. 6 will be activated, as hereinafter explained, to make the link PL0 prefer the controller LC2 over the controllers LC0 and LC1. Thus, when relay CSA operates, it will activate the start circuit (not shown) in the controller LC2 over the path from potential P10 through resistor R1, and the contacts CSA-2, X-7, W-7, CBT1-2 and CBT2-3 to the controller LC2.

To illustrate how the operated relay CSA selects a preferred and idle controller, let it be assumed at this point that the link controllers LC1 and LC2 both are busy serving other position links and that the controller preference relays W and X of FIG. 6 are operated as explained. While the controllers LC1 and LC2 are busy serving the other position links, the controller busy test relays CBT1 and CBT2 of FIG. 6 will be operated under the control of the busy indicating circuits (not shown) in the controllers LC1 and LC2 in a manner as disclosed in the Curtis disclosure. When controller LC2 is busy, it supplies ground to lead CBL2 of FIG. 6 to complete the circuit through contacts X-5 or X-6 and the upper winding of relay CBT2 to the negative potential P9 to operate the relay CBT2. Similarly, when the controller LC1 is busy, it applies ground to lead CBL1 to complete the circuit through contacts W-5 or W-6 and the upper winding of relay CBT1 to the negative potential P11 for operating relay CBT1.

Thereafter, when relay CSA is operated, it locks the relays CBT1 and CBT2 operated while the position link PL0 selects the position link controller LC0. Relay CBT2 locks operated over the path from the negative potential P9 through its lower winding, diode CB2 and contacts CBT2-1, CBT0-1 and CSA-1 to ground. Relay CBT1 locks operated over the path extending from the potential P11 through the lower winding of relay CBT1, diode CB1 and contacts CBT1-3, CBT0-1 and CSA-1 to ground. The locking of the latter relays prevents the position link PL0 from shifting its preference from controller LC0 to one of the controllers LC1 or LC2 which may become idle after the position link PL0 has seized controller LC0. As well, the locking of relays CBT1 and CBT2 prevents link PL0 from seizing more than one link controller.

Figure 8:
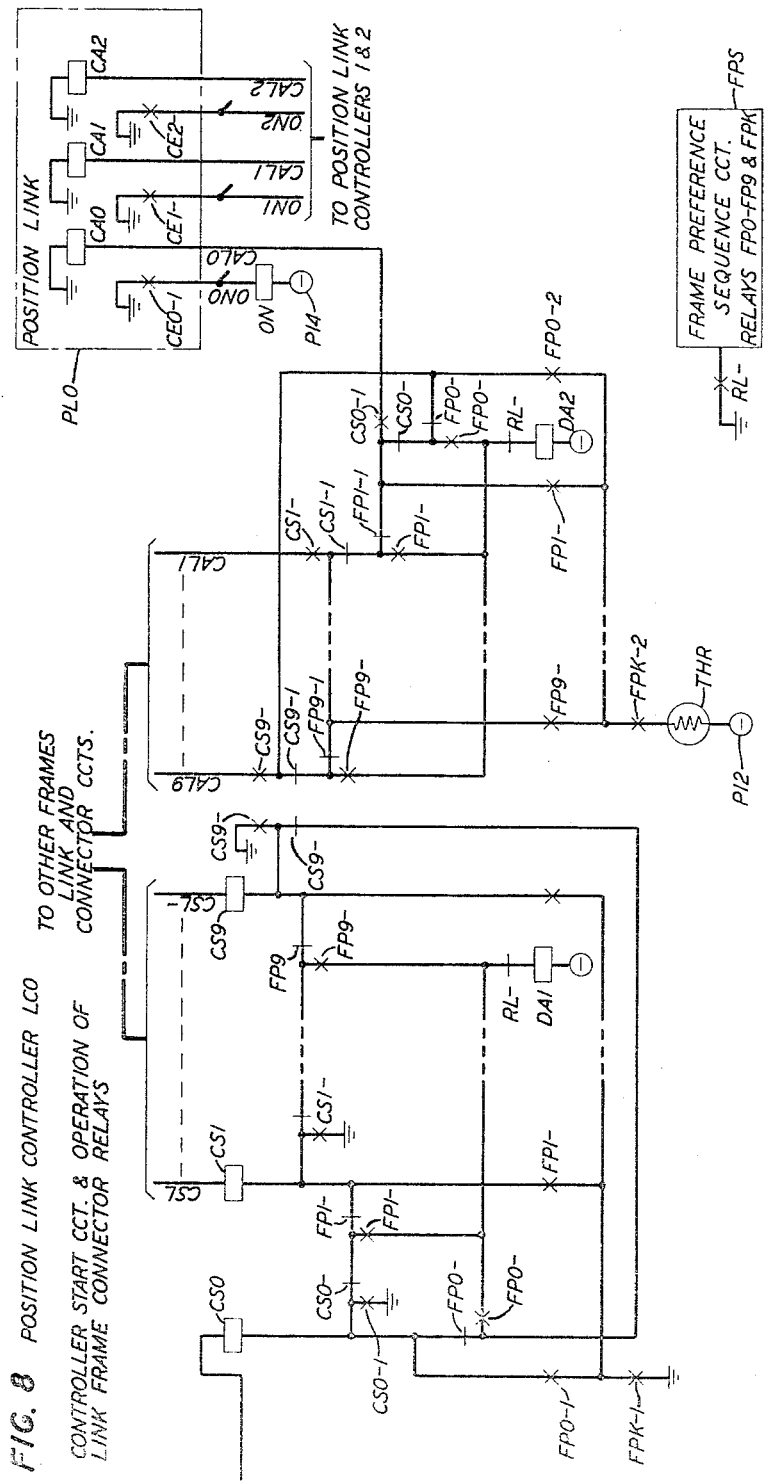

After relays CBT1 and CBT2 have been operated, the operation of relay CSA of FIG. 6 initiates the selection of the link controller LC0 by operating the relay CS0 in the start circuit of controller LC0 of FIG. 8. Before describing the operating path for relay CS0, it is advisable to explain that the latter path may include one of many different combinations of the contacts of the frame preference relays included in the frame preference sequence circuit FPS of FIG. 8. The sequence circuit FPS is shown in block diagram form in FIG. 8 to simplify the drawing. The circuit is disclosed in detail in FIG. 131 of the aforementioned Curtis disclosure. As disclosed in the latter disclosure, circuit FPS includes an endless chain of frame preference relays FP— which coordinate the position link requests and permit the request on one position link to be served at a time by the controller LC0. The contacts of the FP— relays are included in the operate paths for the relays CS0-CS9 of FIG. 8 to insure that only one of the CS0-CS9 relays is activated at any one time and to rotate the position link preference after each usage of the link controller LC0.

Let it be assumed at this time, for ease of understanding, that only CS0 is to be operated and let it also be assumed that relay FP0 is operated. Also, let it be assumed that the frame preference check relay FPK (not shown) is operated in a manner as described in the Curtis disclosure. This being the case, the circuit is completed on the operation of the controller start auxiliary relay CSA for operating relay CS0 of FIG. 8. This circuit is from potential P10 in FIG. 6 through resistor R1, contacts CSA-2, X-7, W-7, CBT1-2, CBT2-2 and CBT0-2, lead CSL0 to FIG. 8 and through the winding of relay CS0 and the contacts FP0-1 and FPK-1 to ground. Upon operating, relay CS0 closes a locking path for itself through its contact CS0-1 of FIG. 8 to ground.

The operation of relay CS0 activates the busy indicating circuits, FIG. 6, of the link controller LC0, as described in the Curtis disclosure, in order to ground all of the controller busy leads CBL— (not shown) to all position link connectors with the exception of the lead CBL0 associated with the position link connector PL0, which is now connected to the controller LC0. The grounding of these leads causes the operation of the controller busy test relays (not shown) corresponding to the relay CBT0 of FIG. 6 in the position links PL1-PL9 to indicate that the controller LC0 is busy. The circuit details of the busy indicating circuit shown in block diagram form in FIG. 6 are disclosed in FIG. 116 of the cited Curtis disclosure. After the controller busy test relays in the position links PL1-PL9 have been operated, these links are prevented from selecting controller LC0 until after it has completed the servicing of calls associated with the position link PL0.

Figure 7:
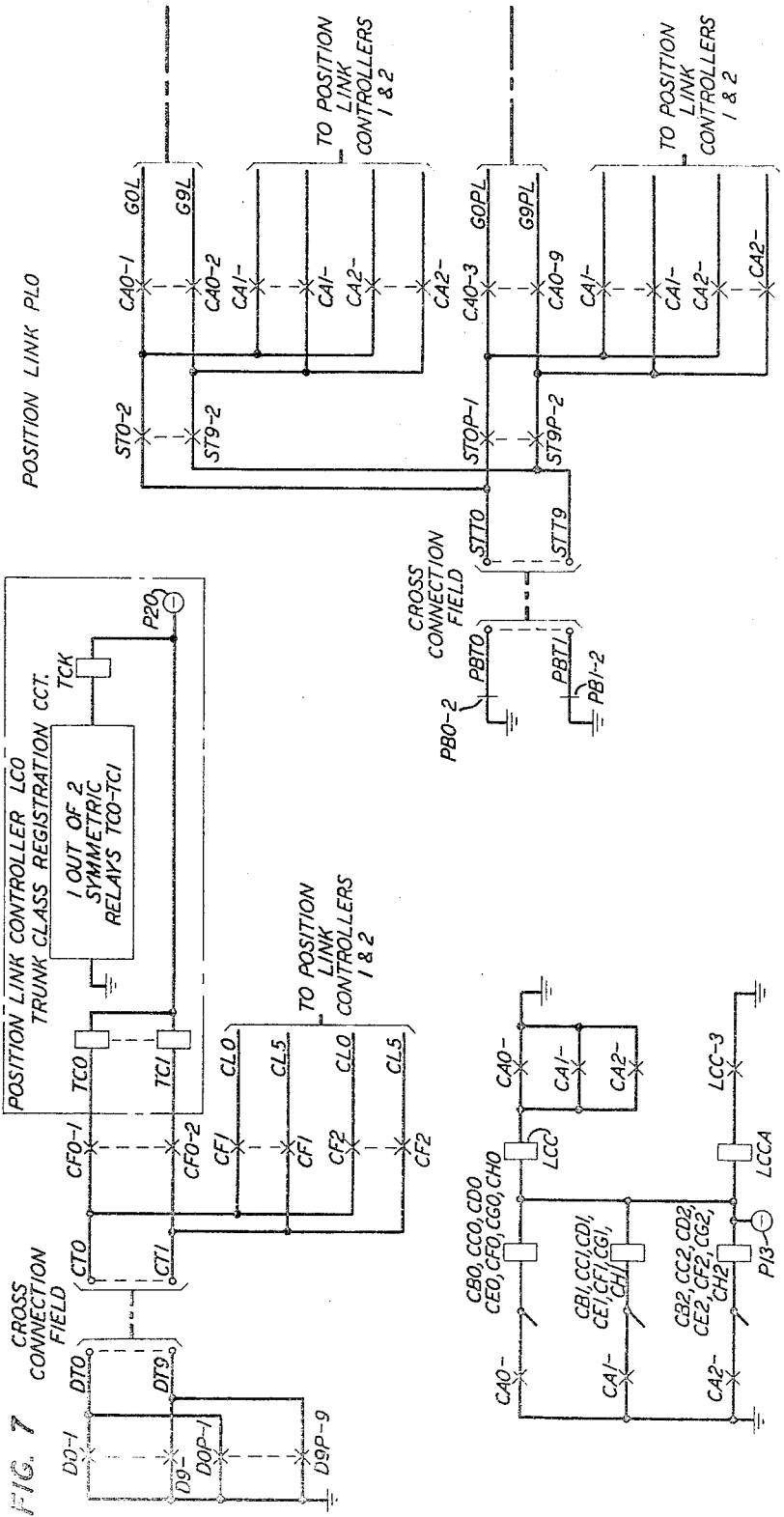

When the controller start relay CS0 operated as explained, it completed a path for operating the controller-attached relay CA0 in the position link connector PL0 of FIG. 7. In the event that two or more of these controller start relays CS— are operated at the same time, the negative potential P12 of FIG. 7 will be applied to only one of the controller-attached leads CAL0-CAL9 under the control of the preference circuit comprising the contacts of the frame preference relays FP0-FP9 (not shown). The details of the preference circuit and the manner in which the preference is rotated are explained in the aforementioned Curtis disclosure. Let it be assumed at this time, for simplicity, that only relay CS0 is operated and let it be assumed that the relay FP0 is operated. Also, let it be assumed that the check relay FPK (not shown) is operated. In such a case, a path is closed from potential P12 of FIG. 7 through the thermal resistance THR, contacts FPK-2 FP0-2, CS9-1 and FP9-1, contacts (not shown) of the intermediate frame preference relays FP8-FP2 (not shown), contacts CS1-1, FP1-1 and CS0-1, lead CSL0 and the winding of relay CA0 to ground. The completion of the latter path operates the controller-attached relay CA0.

The operation of relay CA0 in turn completes circuits for operating the multicontact relays CB0, CC0, CD0, CE0, CF0, CG0, CH0, and LCC depicted in FIG. 7 over the obvious paths to connect a multiplicity of information and control leads from the position link PL0 to the controller LC0. Upon operating, relay LCC operates the relay LCCA of FIG. 7 over the path from ground through the contact LCC-3 and the winding of relay LCCA to the negative potential P13. The operation of relay LCC also completes a locking path for the relay CSA of FIG. 6 from ground through the contacts LCC-1 and RL-1 to the winding of relay CSA.

The operation of relay LCCA in turn operates the relay CCP of FIG. 6 over the path from the negative potential P8 through the winding of relay CCP and the contact LCCA-1 to ground. The operation of relay CCP advances the WXZ relay walking circuit of FIG. 6 one step. The stepping of the walking circuit alternates the preference circuit interconnecting the negative potential P10 of FIG. 6 with the seizure, such as lead CSL0, to the various link controllers LC0-LC2 so that upon the serving of the next call by the position link PL0, a different controller may be seized. Upon operating, relay CCP causes the operation of relay Z of FIG. 6 over the path from potential P6 through the winding of relay Z and the contacts Z-3, W-8, X-8 and CCP-1 to ground. When operated, relay Z completes a locking path for itself through contacts Z-4 and W-2 to ground. At the same time, it completes an auxiliary locking path for relay X through the contacts Z-5, W-8, X-8 and CCP-1 to ground. No further action will occur in this walking circuit until relay CCP is released when the position link PL0 is disconnected from the controller LC0. When it is so disconnected, relay LCCA will release and in turn release relay CCP. The release action of relay CCP opens contact CCP-1 to cause the release of relay X. Upon the release of relay X, an auxiliary holding path is completed for maintaining relay W operated. This latter path is through contacts Z-6, W-3, X-2 and CCP-2 to ground. Under such conditions, the position link PL0 will most prefer the link controller LC2 on the next seizure of a controller by being able to apply the potential P10 of FIG. 6 through resistor R1 and the contacts CSA-2, X-9, Z-7 and CBT2-3 to the start circuit (not shown) of controller LC2.

The operation of the multicontact relay CE0 of FIG. 7, as previously stated, causes the operation of the off-normal relay ON of FIG. 8 over the path from the negative potential P14 through the winding of relay ON, lead ON0 and contact CE0-1 to ground. Operated relay ON closes various control paths within the position link controller LC0 to enable that circuit to serve the calls in the position link PL0.

Referring now to the lower right-side of FIG. 7, the terminals PBT0 and PBT1 are associated with the two different classes-of-service into which the trunk circuits on the position link PL0 may be arbitrarily subdivided. The break contact intermediate each PBT-terminal and ground is closed if an operator position is currently available to serve calls of this type represented by the PBT-terminal while the break contact is opened to remove ground from the terminal in the event that no operator position is available. These contacts are controlled by the PB-relays of FIG. 5 which are activated under control of the traffic regulator TR. Thus, for example, ground will be applied through contact PB0-2 to the terminal PBT0 only in the event that an operator position is available to serve dial "0" calls.

The cross connection between the terminals PBT0-PBT1 and the terminals STT0-STT9 classifies each of the ten groups of trunk circuits of the position link PL0 to one of the classes-of-service, dial "0" or special service. It is assumed that the call currently being described is that of the dial "0" type, that the incoming trunk circuit TC00 serving the call is in trunk group 0 on the position link PL0 and has already operated relay ST0. Consequently, terminal STT0 is connected to terminal PBT0 thereby indicating that all calls served by trunk group 0 on position link PL0 will be of the dial "0" type. There are ten terminals STT0-STT9 and only two terminals PBT0-PBT1 and therefore certain of these PBT-terminals must be connected to more than one of the STT-terminals.

*Registration of calling trunk group identity in position link controller*

Figure 9:
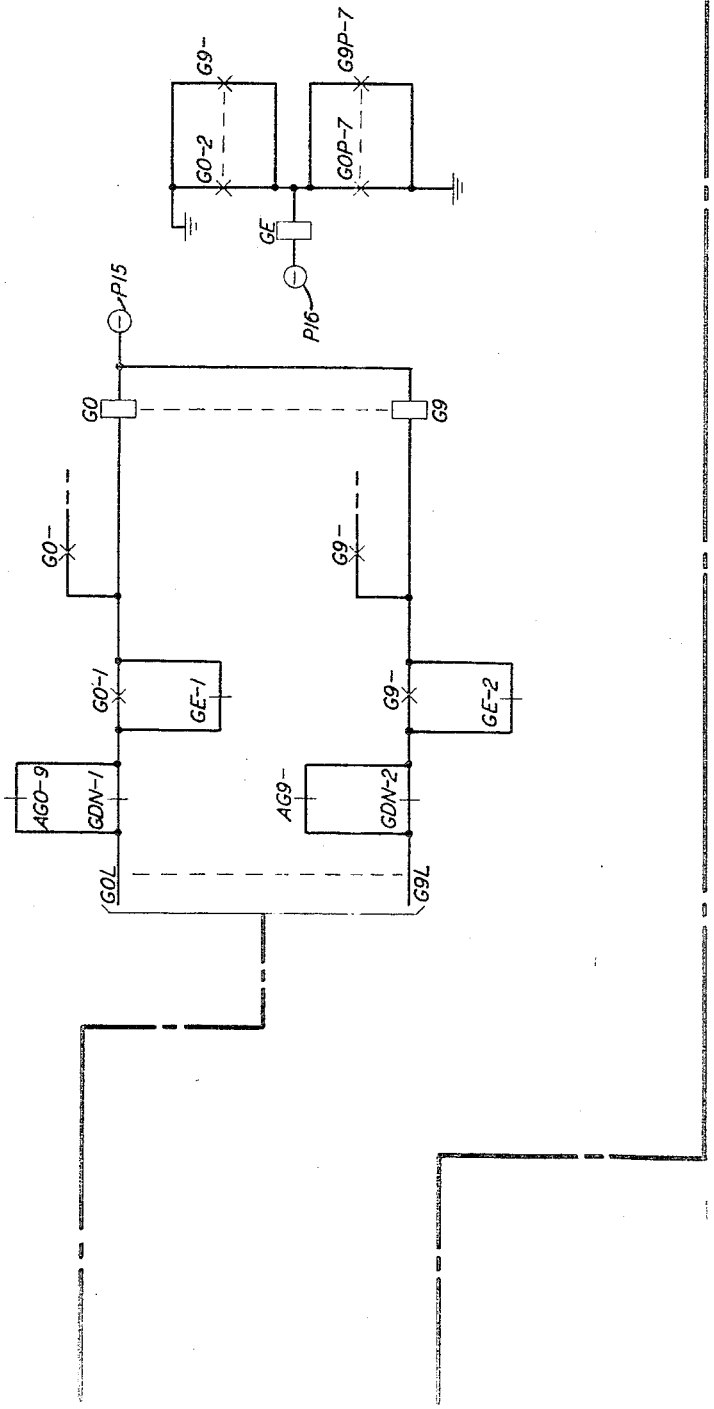

Following the operation of the controller-attached relay CA0 of FIG. 8, a path is completed for operating the trunk group registration relay G0 in the link controller LC0 of FIG. 9 for storing the identity of the trunk group 0 which has a registered service request. This path is from the negative potential P15 through the winding of relay G0, contacts GE-1 and GDN-1, lead G0L, contacts CA0-1 and ST0-2, terminals STT0 and PBT0 and contact PB0-2 to ground. Relay G0 in operating closes a path over its contact G0-1 to by-pass the contact GE-1 for holding relay G0 operated after the trunk group registration ended relay GE of FIG. 9 is subsequently operated. The latter relay is operated by relay G0 over the path from the negative potential P16 through the winding of relay GE and contact G0-2 to ground. In operating, relay GE opens its contacts, such as contacts GE-1 and GE-2, in the operate paths for the relays G0-G9 and thereby prevents the recognition of requests for service from other trunk groups while trunk group 0 is awaiting service.

Reviewing the circuit actions just described, it may be seen that when the link controller LC0 is connected to the position link PL0, ground will appear on one or more of the group start leads G0L-G9L of FIG. 9 corresponding to those groups on the position link containing trunk circuits bidding for service. The relays G0-G9 associated with the group start leads operate and in return operate the group registration ended relay GE which functions as a gate to prevent the controller from recognizing the subsequent appearance of a ground on any of the start leads G0L-G9L not grounded at this time. Those of the group relays G0-G9 which have operated lock themselves to their respective start leads G0L-G9L. In this manner, the controller LC0 has registered the trunk groups containing non-priority requesting trunk circuits and will serve only those groups on this particular usage. In addition, only the trunk circuits within the registered groups which have bids for service at this time will be served. The latter feature is accomplished by means of the calls-waiting system employed on the position link PL0 which system employs the M- and G-relays of FIG. 3 associated with each trunk circuit non-priority start lead.

Prior to the operation of relay GE, a trunk group request, such as a request from trunk group 9, may be registered in the link controller LC0 in addition to the aforementioned request from trunk group 0. To illustrate, assume that trunk circuit TC94 had requested connections to an operator position in a manner as previously explained and had operated its non-priority start relay ST9 in a manner as previously explained and that a position is available to serve the call associated with trunk circuit TC94. Accordingly, when the controller-attached relay CA0 is operated as previously explained, a path is completed for operating the relay G9 of FIG. 9 to register a request for trunk group 9. This path is from potential P15 through the winding of relay G9, contacts GE-2 and GDN-2, lead G9L, contacts CA0-2 and ST9-2, terminals STT9 and PBT1, and contact PB1-2 to ground.

*Position link controller selects the calling trunk group*

After the identity of the calling trunk group or groups has been registered by the relays G0-G9, controller LC0 proceeds to select and serve that group which is highest in preference. This action is initiated when relay GE of FIG. 9 is operated, as previously explained, and closes a ground to the trunk group selection circuit of FIG. 10 which results in the operation of one pair of the auxiliary group relays AG0–AG9 and AGA0–AGA9 in FIG. 10. The selection circuit comprises a closed ring of transfer contacts whose entry point is determined by the trunk group preference relays TGP0–TGP9 of FIG. 12, one of which will have been previously operated. The specific manner in which a preference relay is always operated is described hereinafter. This circuit is designed so that only one pair of the auxiliary group relays AG0–AG9 and AGA0–AGA9 will operate. The operation of one of the AG- and AGA-relays determines the trunk group which will be served in the event that two or more such groups are bidding. The AGK and AGKA relays are then operated as a check that an AG-relay has operated and as a further check that only one such relay has been operated.

In order to illustrate the various features of this trunk group selection circuit, it will initially be assumed that the preference relay TGP0 is operated and thereby gives preference to the operation of the relays AG0 and AGA0 of FIG. 10. When relay GE of FIG. 9 operates as previously explained, relays AG0 and AGA0 are operated in a circuit shown in FIG. 10 extending from the negative potential P17 through the windings of relays AG0 and AGA0 in parallel, contacts G0–3 and TGP0–1, break contacts on the G0P–G9P relays and relays AG0–AG9, and the contacts GE–3, TGPK–1 (which is a contact on the preference check relay and whose operation is later described), SNG–1 and ON–1 to ground. Upon operating, relay AG0 closes a locking path for itself and relay AGA0 through contacts AG0–1, GE–3, TGPK–1, SNG–1 and ON–1 to ground.

Now to vary the circuit condition somewhat, let it be assumed that relay TGP9 is operated instead of the relays TGP0 and thereby gives preference to the operation of the relays AG9 and AGA9. In that case, relays AG9 and AGA9 are operated over the path extending from the negative potential P17 through the windings of relays AG9 and AGA9 in parallel through the contacts G9–1 and TGP9–1, break contacts of the relays G0P–G9P and AG0–AG9, contacts GE–3, TGPK–1, SNG–1 and ON–1 to ground. Upon operating, relay AG9 closes its contact AG9–1 to complete a locking path for itself and relay AGA9. Thus, with the closure of contact G0-3 or G9-1 and with trunk group 0 or 9 bidding for non-priority service, it may be seen that relays AG0 and AGA0 or AG9 and AGA9 will be operated in accordance with which one of the preference relays TGP0 or TGP9 is operated.

The operation of one of the AG0–AG9 relays in FIG. 10 as described and in particular the operation of relay AG0 in connection with the call on trunk circuit TC00 or relay AG9 in connection with the call on trunk circuit TC94, completes a path for operating the check relays AGK and AGKA of FIG. 10 over the path of potential P17 through the windings of relays AGK and AGKA in parallel through the one-out-of-ten symmetric circuit comprising contacts of relays AG0–AG9 to ground. The operation of these relays checks that only one of the AG0–AG9 relays is currently operated.

Figure 11:
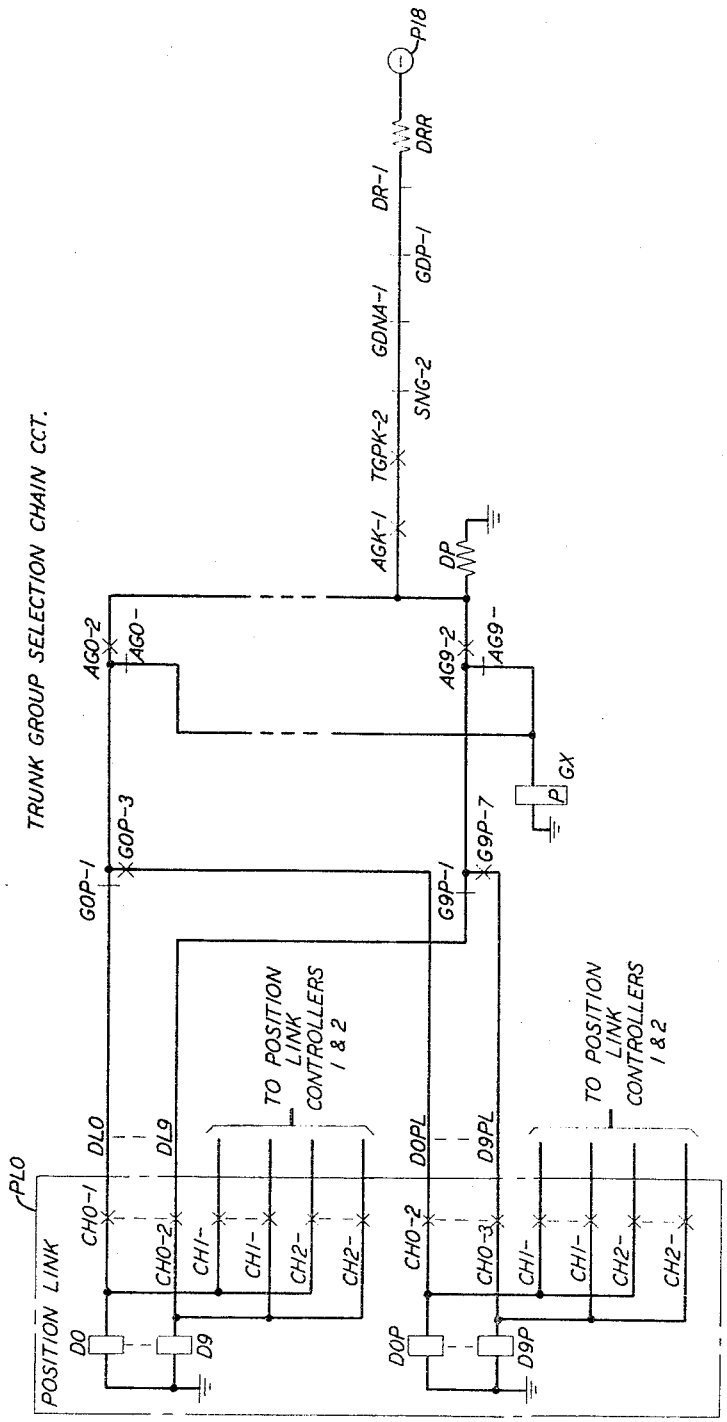

Referring to FIG. 11, it may be seen that there are ten D– relays, D0–D9, in the position link PL0, each of which is individual to a different incoming trunk group served by link PL0. One of these D– relays is operated as a result of the foregoing operations of the trunk group selection circuit, FIG. 10, in controller LC0 to select a particular trunk group for conection to an idle operator position. In the instant case, it is noted that as a consequence of the operation of relays AG0, AGA0 and AGK, a path is now completed to operate the relay D0 as an indication that the control LC0 will serve trunk group 0. This path is in FIG. 11 from ground through the winding of relay D0, contact CH0–1, lead DL0, contats G0P–1, AG0–2, AGK–1, TGPK–2, SNG–2, GDNA–1, GDP–1 and DR–1, and resistor DRR to the negative potential P18.

In FIG. 11, a group cross relay GX is provided which will operate if two or more of the DL0–DL9 leads are crossed. This relay is a sensitive, low resistance relay which acts as a shunt around the windings of all of the D0–D9 relays except for the one to be operated. If the winding of the relay selected for operation is crossed to the winding of one of the other D– relays through the DL– leads, then relay GX will shunt the windings of all of the other relays in the group and normally none of them will operate. The operation of relay GX blocks the call, causes a request for connection to be made to a trouble recorder circuit in order to automatically record the existence of this type of trouble. The manner in which such a trouble record is made for the call is discussed in the aforementioned Curtis disclosure.

If the controller LC0 had selected for service the trunk group 9 instead of the trunk group 0 on the position link PL0, the relays AG9 and AGA9 would be operated instead of the relays AG0 and AGA0 as previously described. Accordingly, the relay D9 of FIG. 11 would have been operated instead of relay D0. Relay D9 operates over the path from ground through the winding of relay D9, contact CH0–2, lead DL9, contacts G9P–1, AG9–2, AGK–1, TGPK–2, SNG–1, GDNA–1, GDP–1 and DR–1, and resistor DRR to potential P18.

Pausing briefly to review the circuit action described thus far and referring to FIGS. 2–11, it may be seen that the ten trunk groups are now presenting their requests for non-priority service to the link controller LC0 over the ten groups of conductors NPS0–NPS04 through conductors NPS90–NPS94 of FIG. 3. The trunk circuit serving the present call is assumed to be the trunk circuit TC00 in trunk group 0, and therefore the seizure of the position link connector by this trunk circuit resulted in, among other things, the operation of relays M00 associated with the trunk circuit TC00. The position link PL0 in turn requested the services of the controller LC0 and succeeded in connecting itself to that controller. Thereafter the relays CA0 through CG0 were operated on FIGS. 8 and 7. This connection also resulted in the closure of five make contacts designated CD0–1 through CD0–5 on FIG. 3 to prepare a path for interconnecting the non-priority start leads NPS– of the calling trunk circuits with the associated conductors TL0–TL4 on FIG. 3 extending to the controller LC0.

The controller LC0, as a consequence of its seizure by the position link PL0, examines all trunk groups to see which trunk groups are currently requesting service, and seizes only the most preferred group in the event that two or more trunk groups are simultaneously bidding. The controller also determined that trunk group 0 was to be the most preferred trunk group and accordingly completed a path for operating the relay D0 of FIG. 11 to inform the position link PL0 that a calling trunk in its trunk group 0 will now be served.

*Controller receives class information from position link*

The operation of relay D0 of FIG. 11 closes the five make contacts designated D0–2 through D0–6 on FIG. 3 to extend the non-priority start leads NPS0–NPS4 for trunk circuits TC00–TC04 through the contacts M00– through M04 or G0–, D0–2 through D0–6 and CD0–1 through CD0–5, leads TCL0–TCL4, contacts PTC–1 through PTC–5 to the windings of relays T0–T4.

Trunk circuit TC00 is assumed to be serving the present call and therefore, upon the operation of relay D0, a path will be completed from ground on lead NPS0 though the contacts M00–1, D0–2, CD0–1, lead TCL0, contact PTC–1 and the winding of relay T0 to the negative potential P19 for operating relay T0 and thereby registering the identity of the bidding trunk circuits TC00 in the link controller LC0. Any other of the relays T1–T4 of FIG. 3 would also now be operated by the ground on its associated lead NPS– if the associated trunk circuit was requesting connections to an operator position at this time. The operation of relay T0 of FIG. 3 closes a holding circuit for itself over its contact T0–1 to ground on the associated TCL0 lead thereby shunting the break contacts of the relay PTC– of FIG. 13.

The trunk class relays TC0–TC1 of FIG. 7 provide a means for registering class information concerning the calling trunk circuit in the controller LC0. The windings of these relays are connected through the contacts CF0–1 and CF0–2 to the class terminals CT0 and CT1. Terminals CT0 and CT1 are in turn cross-connected to the terminals DT0–DT9 each of which is associated with the correspondingly designated trunk group 0–9. A ground is placed on a DT– terminal by virtue of the D0–D9 relay contacts whenever its associated trunk group has been selected for service by the controller LC0. The grounding of this terminal in turn grounds the cross-connected CT– terminal which, in turn, operates its associated TC0–TC1 relay in FIG. 7, thereby signifying the class information concerning the calling trunk group to the link controller LC0. On FIG. 7, terminal DT0 is connected to the terminal CT0 thereby providing a means whereby a dial "0" class-of-service digit 0 is applied to the controller LC0 each time trunk group 0 is selected for service.

Accordingly, when relay D0 is operated as previously explained, a circuit is completed for operating the trunk class relay TC0 over the path from the negative potential P20 through the winding of relay TC0, contact CF0–1, terminals CT0 and DT0, and the contact D0–1 to ground. The operation of this relay registers a trunk class digit 0 in the controller LC0. The operation of relay TC0 also completes a circuit to operate the trunk class check relay TCK of FIG. 7. This latter circuit is from potential P20 through the winding of relay TCK and a one-out-of-two symmetric comprising the contacts of the relays TC0–TC1 on FIG. 7 to ground. This relay operates in the event that one and only one of the two relays of the symmetric is operated.

*Trunk group and units preference circuits*

Figure 12:
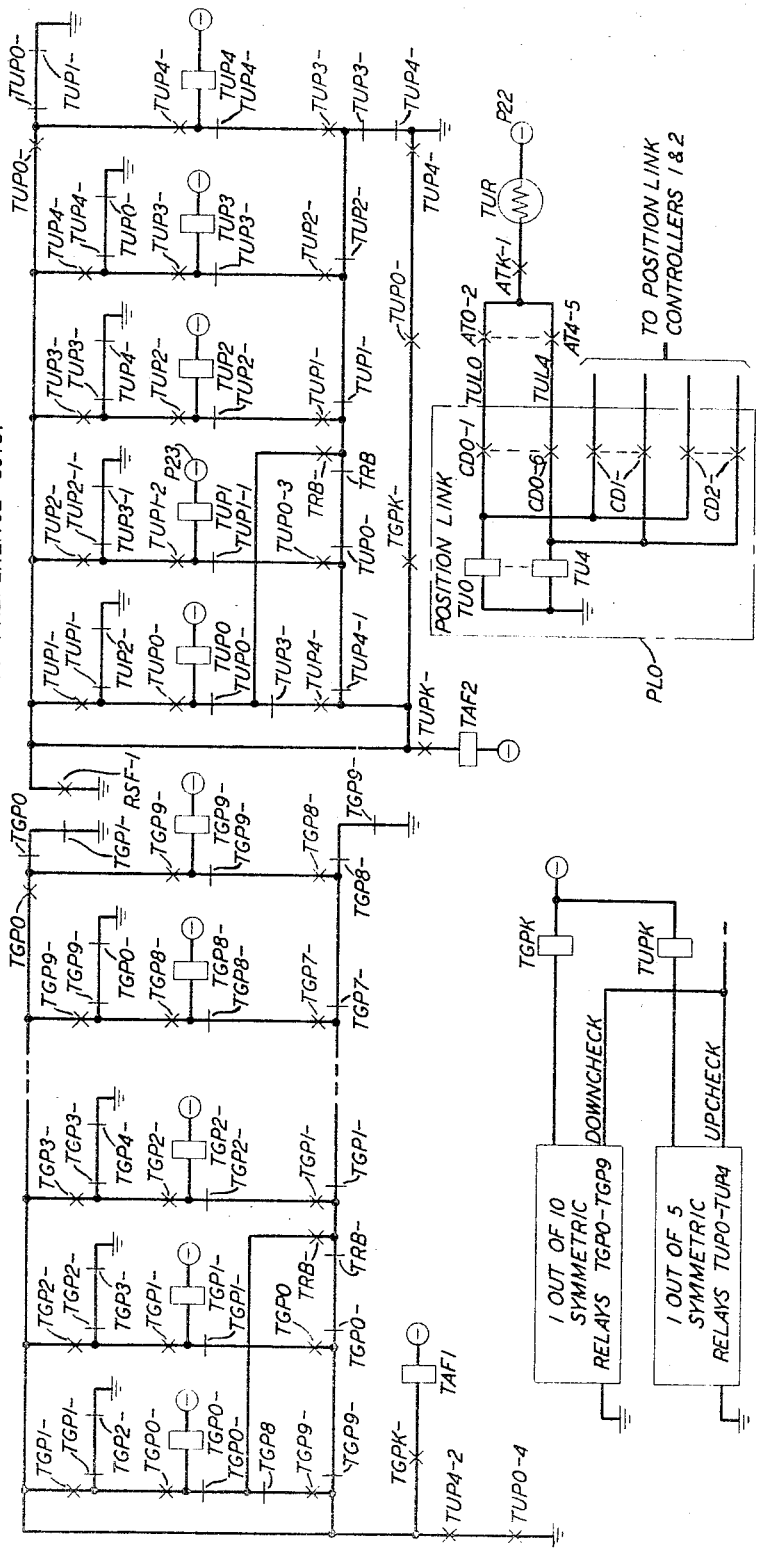

The following describes the trunk group and units preference circuits of FIG. 12. The fifty trunk circuits served by each position link connector are divided into ten subgroups of five trunks each. Each position link controller provides one preference relay for each of the five trunk circuits within a group. These relays are designated TUP0–TUP4 and are arranged in a contact chain which constrains the circuit so that in the quiescent state only one of these relays will be operated. The operated relay places the trunk circuits with the corresponding numerical units digit designation in the highest preference.

When the frame preference circuit depicted in the block diagram of FIG. 8 has undergone one complete rotation as described in the Curtis disclosure, the relay RSF (not shown) is operated. Relay RSF is shown on FIG. 131 of the Curtis disclosure. The operation of relay RSF (not shown) in operating advances the trunk units preference by one step as follows. The operated relay TUP– of FIG. 12 partially completes a circuit to the succeeding TUP– relay. For example, the operated relay TUP0 partially completes a circuit for operating relay TUP1 through contact TUP0–3. The RSF relay (not shown) in subsequently operating completes this circuit and the succeeding trunk units preference relay operates and locks through the break contacts of the two preference relays succeeding it. Carrying on with the immediately preceding specific example, it is noted that upon the operation of relay RSF, relay TUP1 is operated over the path from the negative potential P23 through the winding of relay TUP1 and the contacts TUP1–1, TUP0–3, TUP4–1 and RSF–1 to ground. When operated, relay TUP1 locks to the ground supplied through the contacts TUP3–1, TUP2–1 and TUP1–2. The just operated preference relay transfers the locking path of the previously operated preference relay to the RSF contacts which control this circuit and thereby holds it operated until relay RSF is released.

With two trunk units preference relays operated, the trunk group preference up-check relay TUPK of FIG. 12 releases. The release of this relay controls the operation of relay RSF (not shown) to insure that the latter relay will remain operated until the trunk group preference circuit advances. When the circuit subsequently restores to normal, that is, only one of the units preference relays is operated, the relay TUPK reoperates and partially conditions the position link controller for the trunk units selection.

Each position link controller also provides one preference relay for each of the ten trunk groups on the position link connectors PL0–PL9. These relays are designated TGP0–TGP9 and form part of the trunk group preference circuit. This circuit is completely analogous in its operation to the trunk units preference circuit just described and hence will not be described in detail. This circuit is advanced one step at the end of each complete rotation of the trunk units preference circuit under the control of the contacts TUP0–4 and TUP4–2.

Referring to FIG. 12, it is again noted that relays TGP0–TGP9 comprise a preference circuit for the trunk group selection while the relays TUP0–TUP4 comprise a preference circuit for the trunk units selection. It should be emphasized at this point that one and only one relay in each of these preference circuits will normally be operated at any one time except when the preference is being shifted. This being the case, an obvious circuit is closed in FIG. 12, to operate the check relay TGPK for the trunk group preference circuit which includes a one-out-of-ten symmetric of the contacts comprising the ten relays TGP0–TGP9 in the trunk group preference circuit, while a check relay TUPK for the trunk unit selection is operated over an obvious circuit including a one-out-of-five symmetric including contacts of the five relays TUP0–TUP4 in the trunk units selection circuit of FIG. 12.

*Trunk unit selection by the position link controller*

Having selected the trunk group 0 as the group whose calls will now be served and having registered the bidding trunk circuits within the selected group as evidenced by the operation of the relays T0 together with any of the other T– relays associated with a non-priority requesting trunk circuit, the controller LC0 now proceeds to select the most preferred one of the non-priority requesting trunk circuits. This is accomplished by the trunk units selection circuit as shown on FIG. 12 which comprises a closed ring of transfer contacts whose entry point is determined by the trunk units preference relays TUP0–TUP4, one of which will be preoperated as hereinbefore described. This enables one of the relays AT0–AT4 of FIG. 10 to be operated to identify the most preferred trunk circuit in trunk group 0. The relay ATK of FIG. 10 is then operated as a check relay that one and only one of the relays AT0–AT4 has been operated.

Assuming that the trunk unit preference relay TUP0 of FIG. 12 is operated, a path will be completed for operating the AT0 relay of FIG. 10 when relay T0 has been operated as previously explained. This path is from the negative potential P21 through the winding of relay AT0, contacts T0–1, AT0–1, TUP0–1, RS–1, TAC–1, TUPK–1, SNG–1 and ON–1 to ground. Studying the circuit just described, it may be seen that with relay TUP0 operated relay AT1 would have operated over a similar path in the event that relay T1 of FIG. 3 rather than relay T0 had been operated at this time. Also it may be appreciated that if both relays T0 and T1 were simultaneously operated at this time, relay AT0 would be operated rather than relay AT1 by virtue of the trunk units preference circuit currently giving preference to relay AT0 as indicated by the operation of relay TUP0. In addition, in the event that preference relay TUP1 had been operated rather than TUP0, relay AT1 would have operated if both relays T0 and T1 were operated, and thereby would give preference to the trunk circuit TC01 (not shown) rather than the trunk circuit TC00. If only relay T0 had been operated while trunk units preference relay TUP1 was operated, another circuit path would have been closed to operate the relay AT0. The latter circuit is from the negative potential P21 through the winding of relay AT0, contacts T0–1, AT0–1, T4–1, and AT4–1, break contacts of the relays T2–T3 and AT2–AT3 (not shown), contacts AT1–1, TUP1–1, RS–1, TAC–1, TUPK–1, SNG–1, and ON–1 to ground.

In summation, it may be seen that the operating circuit for the various relays AT0–AT4 includes a preference circuit to select a preferred one of the bidding trunk circuits out of a plurality of bidding trunk circuits. The operation of relay AT0 closes an obvious path for operating the relay ATK of FIG. 10. This relay is a check relay for the relays AT0–4 and its operating circuit includes a one-out-of-five symmetric comprising the contacts of these five relays AT0–4. This insures that the check relay will operate whenever one and only one of the trunk units relays is operated.

Referring to the position link portion of FIGS. 11 and 12, it may be seen that FIG. 12 contains five relays designated TU0–TU4 each of which represents one of the trunk circuit units digits 0–4. FIG. 11 contains the ten relays D0–D9 each of which represents one of the trunk group digits 0–9. On each call one of the relays D– and one of the relays TU– is operated by the link controller LC0 to indicate to the position link PL0 the trunk group selected for service together with the units digit designation of the one-out-of-five trunk circuits in the group that is to be served. Thus, it has been assumed that the call presently described is one being served by trunk circuit TC00 in trunk group 0 and that controller LC0 has determined that this trunk circuit is now to be served. Therefore relays D0 and TU0 of FIGS. 11 and 12 will now be operated.

Upon operation, relay ATK of FIG. 10 places the negative potential P22 of FIG. 12 on one of the five leads TUL0–TUL4 to the position link PL0, the particular one of the five leads having been preselected by the operation of one of the AT0–AT4 relays. The negative potential thus transmitted to position link PL0 causes the operation of one of the associated relays TU0–TU4 therein which notifies the link PL0 of the identity of the most preferred trunk circuit. Having previously selected the trunk circuit TC00 for service, a path is completed upon the operation of relay ATK for operating the relay TU0 of FIG. 12. This path is from ground through the winding of relay TU0, contact CD0–1, lead TUL0, contacts AT0–2 and ATK–1, and the thermal resistor TUR to potential P22. The manner in which relay TU0 thereafter proceeds to connect the necessary busy test leads from the position link PL0 to the controller LC0 so that the controller may ascertain whether or not any of the possible links are idle from the trunk circuit TC00 through the primary, secondary and tertiary switching stages PRI, SEC and TER of FIG. 1 to an available operator position, is not shown in the present drawing. For a complete understanding of the latter circuit details, reference may be made to the aforementioned Curtis disclosure.

*Establishing connections from trunk circuit to operator position*

As mentioned previously in connection with the general description, any incoming trunk circuit may be connected to any one of a maximum of 66 operator position circuits. The link controller LC0 after having selected the trunk circuit to be served and being informed of its class of service, may select one of the position groups which has one or more positions idle and available to serve the call offered by the calling trunk circuit.

Referring again to FIGS. 1 and 2, it is noted that after the link controller LC0 has received the class information from the calling trunk circuit TC00, controller LC0 bids in competition with all of the other link controllers LC1–LC2 to select an available operator position. If the controller LC0 successfully seizes the desired position, it then locks out all of the other controllers LC1–LC2. After controller LC0 has selected the operator position, for example, position OP1, to serve the calling trunk circuit TC00, it must now establish connections through the primary, secondary and tertiary switching stages PRI, SEC and TER in the position link connector PL0 of FIG. 1 to interconnect the circuit TC00 with the selected position OP1. The manner in which the controller LC0 selects the operator position OP1 and establishes connections between that position and trunk circuit TC00 after the relay T00 of FIG. 12 is operated are not disclosed in detail herein. These circuit details may be obtained from the aforementioned Curtis disclosure. The circuit details of the PRI, SEC and TER stages are disclosed in FIGS. 73 through 111 of the Curtis disclosure.

Proceeding now with reference to FIGS. 1 and 2, a general explanation is presented of the manner in which connections are established between position OP1 and trunk circuit TC00. After selecting position OP1, the controller LC0 scans all of the communications channels through the primary, secondary and tertiary stages PRI, SEC and TER of the position link PL0 to find an idle channel capable of interconnecting trunk circuit TC00 with an idle one of the three loop circuits through the position control circuit PCC and position circuit PC to position OP1. When an idle channel has been found, controller LC0 activates the stages PRI, SEC and TER to interconnect trunk circuit TC00 with a position loop to position OP1. Controller LC0 then is released in a manner as disclosed in the Curtis disclosure. At the same time, position control circuit PCC seizes the data transfer circuit DT which then interconnects the trunk circuit TC00 with control circuit PCC in order that circuit TC00 may transmit class mark information to circuit PCC. Following the transmission of this information, the data transfer circuit TR is released. The established connections are thereafter held under control of a control circuit PCC.

After the interconnection of trunk circuit TC00 and control circuit PCC, the operator telephone (not shown) is operatively associated with the call and a zip tone signal is sent from circuit PCC to that telephone for alerting the operator to the call. At the same time, indicator lamps (not shown) are lit at the position to notify the operator of both the class-of-call to be served and the identity of the loop engaged for that call. The operator may now orally request from the calling party both the called and calling station numbers and key both of these numbers into registers (not shown) at her position.

*Establishing connections between incoming and outgoing trunk circuits*

After the operator has keyed the numbers, she then depresses a position key (not shown) which causes the trunk circuit TC00 to seize a sender, for example sender S, through the sender link SL. The depressed key (not shown) also causes the data transfer circuit DT to be activated and to interconnect the trunk circuit TC00, position OP1 and sender S in order that the calling and called numbers and other information registered in the position control circuit PCC may be transmitted to sender S.

In response to the successful receipt of the call information in the sender S, the data transfer circuit DT is released. Meanwhile, sender S seizes a marker, for example marker M, via the marker connector MC and transmits to marker M the information it needs to extend call connections from trunk circuit TC00. Marker M then selects an idle outgoing trunk circuit such as circuit OTC, extending to the called destination, and then selects and closes connections between trunk circuits TC00 and OTC via the trunk link and office link frames TLF and OLF. Once the latter connections have been established, marker M releases and sender S proceeds to outpulse to the next telephone office the information required by that office to complete the call. Sender S then releases and thereby transfers supervision over the connections within the tandem office to the trunk circuit TC00.

While the last-mentioned circuit operations are in progress, the operator may depress a key (not shown) at her position to initiate the recording of the proper call charges in the call data recording equipment CDR of FIG. 1 in a manner discussed in the Curtis disclosure and then to release her position from the call connections.

PRIORITY SERVICE

Each dial "0" trunk circuit, such as trunk circuit TC00, and special service trunk circuits, such as trunk circuit TC94, in the illustrative embodiment is provided with a priority start lead for at times requesting priority service. The priority start leads are shown on FIG. 3 and are designated PS00–PS04 through PS90–PS94. If priority service rather than non-prority service is desired, each trunk circuit will ground its priority start lead PS—rather than its non-priority start lead NPS—. The circuitry of the position link and link controller together cooperate to serve all such trunk circuits bidding for priority service ahead of non-priority bidding trunk circuits.

Registering priority request in position link

Assume, for example, that connections have been established between calling and called stations through the dial "0" trunk circuit TC00 of FIG. 1 in a manner as previously explained and that, after the operator has disconnected her position from those connections, the calling party again requests operator assistance by momentarily depressing the switchhook, or button. In this case, the dial "0" trunk circuit TC00 having supervision over the call will activate its relays PR and D (not shown) in a manner as disclosed in the above-mentioned Curtis disclosure and thereby cause ground to be extended on FIG. 3 through contacts PR–1 and D0–2 in circuit TC00 to the lead PS00 of FIG. 3. This ground is extended further to the winding of the priority relay P00 in the priority register PR of FIG. 3 for operating that relay and thereby registering the priority request for circuit TC00.

Referring to FIG. 4, the operation of relay P00 closes its contact P00–1 to complete a path for operating the priority start relay ST0P and thereby identifying and storing the trunk group 0 identity as having a trunk with a registered priority request. The operation of relay ST0P initiates the circuit actions required to interconnect the trunk circuit TC00 with an idle operator position on a prority basis. The operating path in FIG. 4 is from the negative potential P2 through the winding of relay ST0P, and the contacts P00–1 and P00– and PH0– through PH3– to ground.

If the position link PL0 is not connected to a link controller at the time that it registers the request for priority service, it signals the traffic regulator TR by placing a ground on the PFL0 lead via the constacts ST0P–3 and LCC–4 to operate a PF0 relay in the regulator TR as shown on FIG. 3. When the regulator TR receives a signal from the link PL0 that one or more priority requesting calls are waiting, it handicaps all other position link connectors PL1–PL9 in their bids for the link controllers LC0–LC2 by causing the operation of all of the position busy relays corresponding to the PB0–PB1 relays of FIG. 5 in the non-priority bidding position links PL1–PL9. The operation of these relays in the position links PL1–PL9 makes all operator positions appear busy to these links. The regulator TR also at this time signals all of the controllers LC0–LC2 that there are priority calls waiting to be served in the position link PL0.

Position link seizes position link controller

If a position link controller is busy when it receives such a priority service signal and if the position link to which it is attached does not have any priority requesting calls awaiting service, that controller will complete connections in a manner as previously described between an operator position and the trunk circuit it is in the process of serving and then will disconnect itself from that position link so that it will be available for connection to one of the position links having priority calls awaiting service. This circuit is shown in FIG. 3 wherein the traffic regulator TR is depicted as extending the negative potential P23 through contacts PF0–1, PW–1, G0P, G1P through G8P (not shown) and G9P through the winding of the calls-waiting priority service relay CWP to operate relay CWP.

On the other hand, if the position link controller is at this time connected to a position link having a trunk circuit bidding for priority service, one of the relays corresponding to the relays G0P–G9P of FIG. 13 will be operated in that controller, as hereinafter explained, thereby presenting the operation of the calls-waiting relay CWP in that controller. If a position link is connected to a link controller when a trunk circuit initiates a bid for a priority service, this position link will not signal the traffic regulator TR to this effect.

As a consequence of the foregoing circuit actions, all busy controllers are informed that there is at least one priority requesting call on one or more of the position links which are not connected to controllers. Therefore, if relay CWP operates in a busy controller, that controller will complete the connection to a position for the trunk circuit it is serving and then disconnect itself from that link so that it will be available for serving a posistion link having priority requesting calls-waiting service.

In the event that the position link controller is connected to a position PL0 at this time, which link has a trunk group requesting non-priority service, and that group has been selected for service by the controller as signified by the operation of the group selection ended relay GE of FIG. 9, the position link PL0 will cause the operation of relay PW of FIG. 3 to notify that controller that has a priority call waiting service. The operate path is from the negative potential P24 through the winding of relay PW, contacts GE–5, GDPA–6, G0P–6, CG0–1, LCC–5, ST0P–3 to ground. The operation of relay PW causes the operation of relay CWP of FIG. 3 over the path from ground through the CWP relay winding and the contacts G9P—, G8P— (not shown) through G1P— (not shown), G0P— and PW–2 to potential P19. In operating, relay CWP informs controller LC0 to complete serving the trunk circuit in the process of being connected to an operator position and then temporarily to disconnect itself from link PL0. After the trunk circuit has been connected to an operator position, the position attached check relay PAK of FIG. 14 is operated in a manner as later explained for operating the relay RS of FIG. 13 over the path from the negative potential P23 through the RS relay winding and contacts including PAK–8, ATK–8 and ON–8 to ground.

In operating, relay RS operates the release relay RL of FIG. 4 over the path from the negative potential P31 through the RL relay winding and contacts CWP–9 and RS–11 to ground. Upon operating, relay RL effects the temporary release of the controller attached relay CA0 of FIG. 8, connector relays CB0 through CH0 and relays LCC and LCCA of FIG. 7 in a manner as set forth in the Curtis disclosure. It is necessary in accordance with the exemplary embodiment to disconnect the controller LC0 from the link PL0 in order that, inter alia, the group and registration relay GE may be released and, in turn, condition the trunk group priority service circuit of FIG. 13 for registering the fact that at least one trunk circuit terminated on link PL0 is requesting priority service. This mode of operation enables the priority requesting trunk circuits, such as circuit TC00, to be served before any non-priority requesting trunk circuit which may have previously registered its request in the controller trunk group registration circuit of FIG. 9. After the controller LC0 has been disconnected from position link PL0, it may again be connected to link PL0 in essentially the same manner as described in preceding sections.

When a link controller is connected to a position link having trunk circuits requesting priority service, the position link transmits information to the associated link controller for signifying all of the trunk groups in that link having priority and non-priority requesting trunk circuits. Thus, let it be assumed that trunk circuit TC00 is bidding for priority service and that the position link controller LC0 is again seized by and connected to the position link PL0 in a manner as previously described with respect to the non-priority request from trunk circuit TC00.

*Position link controller selects the priority requesting trunk group*

Figure 13:
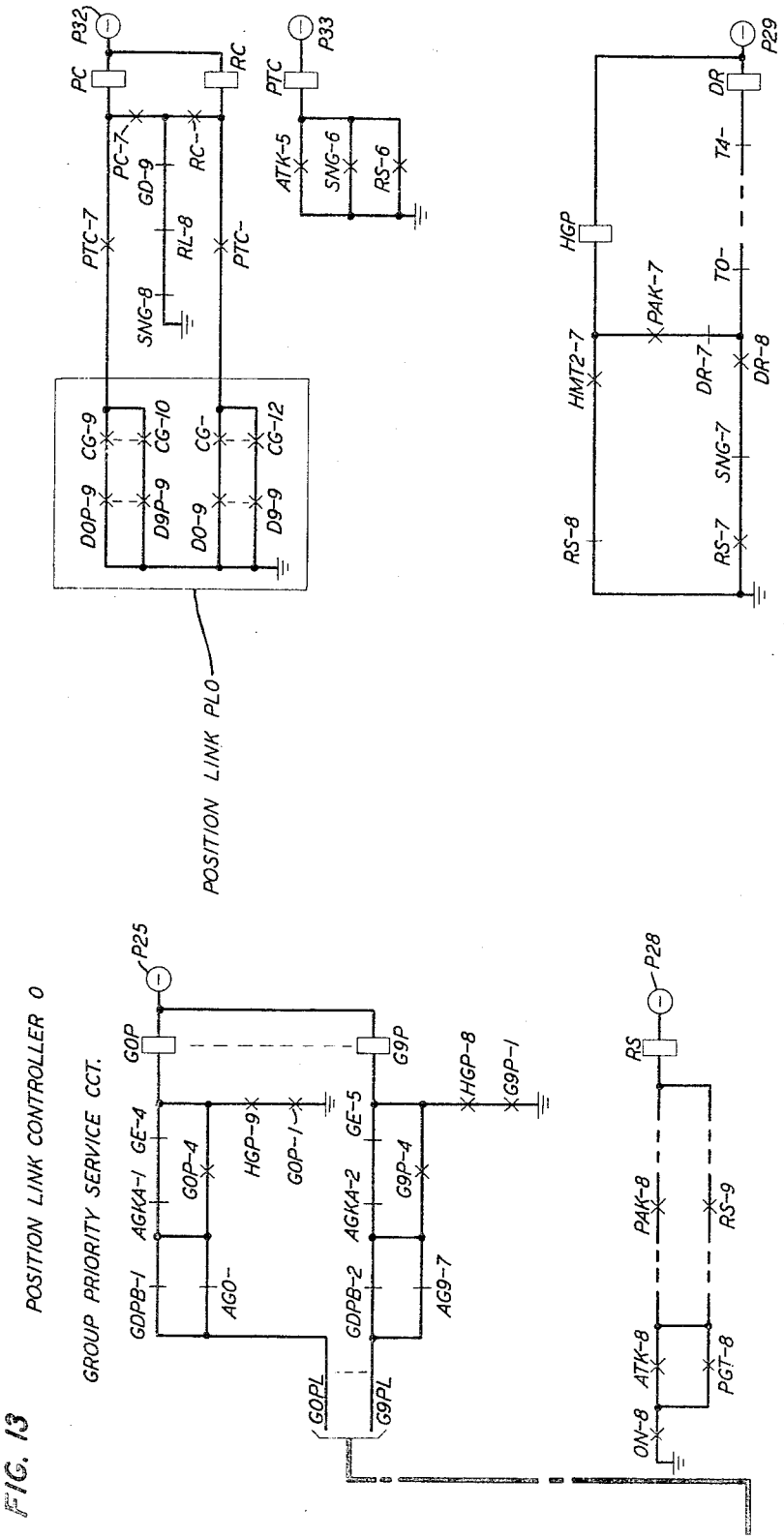

Referring now to FIGS. 7 and 13, it is noted that after the controller-attached relay CA0 has been operated as described hereinbefore and an operator position has been found to be available to serve a dial "0" call, the position link PL0 will complete a circuit for operating the relay G0P of FIG. 13, which registers, or stores, information indicating that a trunk circuit in group 0 is requesting priority service. The latter path extends from the negative potential P25 through the winding of relay G0P, the contacts GE-4, AGKA-1 and GDPB-1, lead G0PL to FIG. 7, contacts CA0-3 and ST0P-1, terminals STT0 and PBT0 and contact PB0-2 to ground. Relay G0P upon operating prepares holding paths to ground for itself over its contacts G0P-9 and G9P-4. Relay G0P locks through contacts HGP-9 and G0P-9 upon the operation of relay HGP of FIG. 13. The latter relay is operated over the path from the negative potential P29 through the HGP relay winding and the contacts HMT2-7 and RS-8 to ground shortly after the trunk circuit TC00 has been connected to an operator position in a manner as explained in the Curtis disclosure. In addition, operated relay G0P operates relay GE over the path from potential P16 through the GE relay winding and contact G0P-7 to ground. Relay GE accordingly signifies the end of the trunk group registration.

Referring to FIG. 10, the trunk group selection circuit in the controller LC0 is designed so that all priority requesting trunk groups are preferred over all other trunk groups requesting non-priority service. Therefore, when a group selection is to be made, if one of the G0P-G9P relays is operated, the correspondingly numbered one of the relays AG0-AG9, as well as one of the AGA0-AGA9 relays, operates and in turn operates the check relays AGK and AGKA. The operation of relay AGK, in conjunction with one of the AG0-AG9 relays and with one of the relays G0P-G9P, functions to operate the correspondingly designated one of the relays D0P-D9P on the position link frame PL0.

Thus, for the present call on trunk circuit TC00, relay G0P is operated as already explained and a path is therefore closed to operate the relays AG0 and AGA0. The latter path is from the potential P17 through the winding of relays AG0 and AGA0 in parallel through the contacts G0P-2, AG0-2, GE-3, TGPK-1, SNG-1 and CN-1 to ground. After the operation of the relays AG0 and AGA0, a circuit path is completed for operating the relays AGK and AGKA from the potential P17 through the windings of relays AGK and AGKA in parallel and the one-out-of-ten symmetric comprising contacts of the relays AG0-AG9 to ground. The operation of the foregoing relays in turn causes the operation of relay D0P of FIG. 11 over the path extending from ground through the winding of relay D0P, contact CH0-2, lead D0PL, contacts G0P-3, AG0-2, AGK-1, TGPK-2, SNG-2, GDNA-1, GDP-1 and DR-1, and the resistor DRR to the potential P18.

*Controller receives trunk class information from position link*

After relay D0P has operated, a circuit is completed for operating the trunk class relay TC0 over the path from the negative potential PL0 through the winding of relay TC0, contact CF0-1, terminal CT0 and DT0 and contact D0P-1 to ground. The operation of this relay registers a trunk class digit 0 in controller LC0 and also causes the operation of the trunk class check relay TCK of FIG. 7 as hereinbefore explained.

The operation of relay D0P also closes its make contacts D0P-1 through D0P-5 to extend the priority start leads PS0-PS4 for the trunk group 0 through the contacts CD0-1 through CD0-5 to the windings of the relays T0-T4 of FIG. 3 which relays are then operated in accordance with the numerical designation of the priority requesting trunk circuits in trunk group 0. It has been assumed that trunk circuit TC00 is bidding for priority service and accordingly the relay T0 of FIG. 3 will be operated at this time.

After relay T0 has been operated, it will complete a circuit for operating the relay AT0 in a manner as previously described. The relay AT0 is part of a preference circuit utilized by the position link controller to select a preferred one of the bidding trunk circuits out of the five trunk circuits in trunk group 0. The operation of relay AT0 in turn closes a path through the one-out-of-five symmetric comprising contacts of the relays AT0-AT4 for operating the relay ATK of FIG. 10 and thereby insuring that only one of the trunk units relays AT0-AT4 has been operated.

The controller LC0 is now connected to the five trunk circuits TC00-TC04 of trunk group 0 by means of the priority start leads PS0-PS4. Since these priority start leads are not gated by the position link PL0, controller LC0 must prevent the recognition of new priority bids from trunk circuits within the trunk group 0. Such new bids may be initiated while controller LC0 is associated with position link PL0, and they would therefore attempt to be served before other previously registered priority bids. However, controller LC0 operates the relay PTC of FIG. 13 immediately after the operation of the relay ATK of FIG. 10. It will be recalled that relay ATK operated as a one-out-of-five check on the relays AT0-AT4 of FIG. 10. On FIG. 3, the break contacts PTC-1 through PTC-5 are activated by relay PTC to function as a gate which prevents the operation of any of the relays T1-T4 which have not been operated shortly after the controller LC0 is cut through to the priority start leads of the trunk circuits of trunk group 0. As a result, none of the trunk circuits TC00-TC04 may thereafter be served before other trunk circuits in other trunk groups which may have previously registered requests for priority service.

After having selected the trunk circuit TC00 for service, the controller LC0 proceeds to complete its functions of selecting an operator position available to serve a dial "0" class call and of selecting and establishing a channel through the primary, secondary and tertiary switching stages PRI, SEC and TER of FIG. 2 in a manner as hereinbefore explained.

The remainder of the circuit actions associated with the serving of priority calls is analogous to that already described in the general description and need not be discussed further.

Advancing from one trunk group to another to serve all priority requesting trunk circuits before any non-priority requesting trunk circuit After the last priority requesting trunk circuit in a trunk group has been served, that is, it has been connected to an operator position, a series of circuit actions occur in the link controller for advancing from that trunk group to another on the same link which has at least one trunk circuit requesting priority service. This advancing operation is utilized to insure that all priority requests are served before any non-priority request. In order to simplify the understanding of these circuit actions, it is deemed advisable to assume that the trunk circuits TC00 and TC94 of FIG. 3 requested priority service and registered these requests at approximately the same time and that circuit TC00 was served before circuit TC94 as previously described.

Before describing the circuit actions that occur after circuit TC00 has been connected to an operator position, it is advantageous to explain the manner in which the priority request of circuit TC94 has been registered in link PL0 and controller LC0. The manner in which the priority request of circuit TC00 is registered has been described in previous sections. When circuit TC94 requests priority service, it extends ground in FIG. 3 through its contacts PR–1, PA–1 and D–2, lead PS94, and the P94 relay winding to the negative potential P32 for operating relay P94 and thereby registering the request in the priority register PR10.

In operating, relay P94 operates relay ST9P of FIG. 4 over the path from potential P6 through the ST9P relay winding and the contacts P94–1 and PH16–1 through PH19–1 to ground. Operated relay ST9P then operates relay CW1 in the regulator TR of FIG. 5 over the path from potential P3 through the CW1 relay winding, the cross-connection field and contact ST9P–1 to ground. Relay CW1, in turn, operates relay G9 in the control gate CG10 of FIG. 5 to block the registration of non-priority service requests of trunk circuits in trunk group 9 by opening its contacts, such as contacts G9–1 and G9–2, in the operate paths for the relays M90–M94 of FIG. 3.

When relay ST9P operates and an operator position is available to serve the call on trunk circuit TC94 (as indicated by the PB1 relay of FIG. 6 being released), a circuit is completed for operating relay G9P of FIG. 13. This circuit is from potential P25 through the G9P relay winding, contacts GE–5, AGKA–2, and GDPB–2 and AG9–7 in parallel, lead G9PL to FIG. 7, contacts CA0–9 and STP9–2, terminals STT9 and PBT1, and contact PB1–2 to ground. In operating, relay G9P closes a locking path for itself through contact G9P–4 to the ground on lead G9PL and prepares an auxiliary locking path for itself through contacts HGP–9 and G9P–9 to ground. Relay HGP operates to complete the latter locking path shortly after trunk circuit TC00 has been connected to an operator position in a manner as set forth in the Curtis disclosure. It operates over the path in FIG. 13 from potential P29 through the HGP relay winding and contacts HMT2–7 and RS–8.

After the relays GOP and G9P have operated to register the fact that trunk circuits in trunk groups 0 and 9 are requesting priority service, the group "registration ended" relay GE of FIG. 9 is operated over the path through contacts GOP–7 and G9P–7. In operating, relay GE opens its contacts, such as contacts GE–1 through GE–5, to open the operate paths for relays G0–G9 and GOP–G9P and thereby block further trunk group registrations in controller LC0.

When operated, relay GOP completes a circuit for operating relay D0P of FIG. 11 over a previously described path. Relay GOP is operated before D9P because, in accordance with the presence assumption, trunk group 0 is preferred over group 9 for service by the controller LC0. Relay D0P in operating causes the operation of relays T0 (FIG. 3), AT0 and ATK (FIG. 10) and relay PTC (FIG. 13) over paths hereinbefore described. The operation of relay PTC, in turn, operates the priority call relay PC of FIG. 13 over the path from the negative potential P32 through the PC relay winding, contacts PTC–7, CG–9 and D0P–9 to ground. Operated relay PC then locks via contacts PC–7, GD–9, RL–8 and SNG–8 to ground. Thereafter, controller LC0 proceeds to control the interconnection of trunk circuit TC00 with an operator position via the switching stages PRI, SEC and TER of FIG. 2 in a manner as described in preceding sections.

After trunk circuit TC00 has been connected to an operator position, its position attached relay PA (not shown herein but shown in FIG. 341 of the Curtis disclosure) is operated, in a manner as described in the Curtis disclosure, to open the operate paths for both relays T0 and P00 of FIG. 3 at its contact PA–1. Upon releasing, relay P00 causes the release of relay ST0P. Released relay T0 causes the operation of relay PAK of FIG. 13 over the path from the negative potential P27 through the PAK relay winding and contacts T0–9, AT0–9, ATK–9 and ON–9 to ground. When operated, relay PAK operates relays RS and DR of FIG. 13. Relay RS operates in the path from the negative potential P28 through the RS relay winding and the contacts PAK–8, ATK–8 and PGT–8 in parallel, and ON–8 to ground. Operated relay RS then closes a locking path for itself through contacts RS–9, ATK–8 and ON–8 to ground. Relay DR operates before relay RS operates and in the path from the negative potential P29 through the DR relay winding, break contacts of relays T0–T4, and the contacts DR–7, PAK–7, HMT2–7 and RS–8 to ground. In operating, relay DR locks through contacts DR–8, SNG–7 and RS–7 to ground.

The operation of relay RS opens the operate path for relay AT0 at contact RS–1 and relay AT0 releases. In turn, relay AT0 releases relay ATK by opening the operate path through the associated symmetric. At the same time, relay AT0 effects the release of relay TU0 of FIG. 12 by opening contact AT0–2. Relays RS also closes contact RS–6 to complete an auxiliary operate path for the already operated relay PST of FIG. 13. Operated relay RS also releases relay HGP of FIG. 13 by opening contact RS–8. In turn, relay HGP releases relay GOP ing contact PGT–8.

When relay DR operates as previously described, it causes the release of relay D0P of FIG. 11 by opening contact DR–1. In releasing, relay D0P also opens the operate path for relay TC0 of FIG. 7 and causes it to release and, in turn, release relay TCK. The release action of relay TCK causes relay PGT (not shown in the present drawing but shown in FIG. 137 of the Curtis disclosure) to release as indicated in the Curtis disclosure and, in turn, to release relay RS of FIG. 13 by opening contact PGT–8.

The release of relay GOP of FIG. 13 causes the operation of the "select next group" relay SNG of FIG. 14 to advance the controller LC0 from serving trunk group 0 to group 9 after all priority requesting trunk circuits (in the present illustration only circuit TC00) in group 0 have been served. It is noted that the advance from group 0 to 9 occurs even though there may be trunk circuits in group 0 which have registered non-priority requests in link PL0. Thus, all priority requesting trunk circuits in the trunk groups 0–9 will be served before any non-priority requesting trunk circuit in these groups.

For the purpose of illustrating one aspect of the operation of the advance circuitry of FIG. 14, assume now that trunk group 0 had registered both non-priority and priority requests in link PL0, that trunk group 9 has registered a priority request in link PL0 for trunk circuit TC94, and that trunk TC00 was the last circuit in group 0 requiring priority service. Accordingly, when relays HGP–6 and T0 release as already explained, relay SNG of FIG. 14 is operated over the path from the negative potential P30 through the SNG relay winding, contacts HMT2–6 and PC–9, break contacts of relays T0–T4, and the contacts HGP–6, RC–9, G0–7, AG0–6, DR–5 and ON–9 to ground.

To vary the operation of the advance circuitry of FIG. 14, assume now that trunk group 0 had registered only priority requests in link PL0 and that trunk circuit TC00 was the last circuit in that group connected to an operator position. Thus, when relays G0P and T0 release, as explained, relay SNG operates in the path from potential P30 through the SNG relay winding, break contacts of relays T0–T4, and the contacts TTFA–9, G0P–6, G0–6, AG0–6, DR–5 and ON–9 to ground.

When relay SNG operates, it locks over the path through contacts SNG–9, AGK–9, GDP–9, GDNA–9, and ON–9 to ground. Relay SNG also releases relay DR to FIG. 13 by opening contact SNG 7. Operated relay SNG further causes the release of relays AG0 and AGA0 of FIG. 10 by opening contact SNG–1. Upon releasing, relay AG0 releases relays AGK and AGKA of FIG. 10 by opening its contact in the associated one-out-of-ten symmetric. In releasing, relay AGK opens the locking path for relay SNG at contact AGK–9 to release it. The release action of relay SNG releases relay PTC by opening contact SNG–6. Released relay SNG also allows the trunk group selection circuit of FIG. 10 to select the next most preferred bidding trunk group for service. According to the present assumption, trunk group 9 is the only other bidding group and is therefore the next group to be served. Thus, when relay SNG releases, relays AG9 and AGA9 of FIG. 10 will be operated over the path from potential P17 through the AGA and AGA9 relay windings in parallel, contacts G9P–6 and AG9–5, break contacts of relays G8P–G1P and AG8–AG1, and contacts G0P–5, AG0–2, GE–3, SNG–1 and ON–1 to ground. In operating, relay AG9 locks through contact AG9–1 which bridges the contacts G9P–6 and AG9–5 of the last described path.

When relay AG9 operates, it also operates relay D9P of FIG. 11 over the path from ground through the D9P relay winding contact CH0–3, lead D9PL, contacts G9P–7, AG9–2, AGK–1, TGPK–2, SNG–2, GDNA–1, GDP–1 and DR–1, and resistor DRR to potential P18. In operating, relay D9P operates the trunk class register relay TC1 of FIG. 7 over the path from potential P20 through the TC1 relay winding, contact CF0–2, terminals CT1 and DT9, and contact D9P–9 to ground. Relay TC1, in turn, operates relay TCK over a path through the associated contact symmetric.

The operation of relay D9P also causes the operation of relay T4 of FIG. 3 to register the units identity of trunk circuit TC94 in controller LC0. Relay T4 operates over the path from potential P19 through the T4 relay winding, contact PTC–5, lead TCL4, and contacts CD0–5 and D9P–8 to the ground on lead PS94. When operated, relay T4 operates relay AT4 of FIG. 10 over the path from potential P21 through the AT4 relay windings, contacts T4–3 and AT4–1, break contacts of relays T2, T3, AT2 and AT3, contacts T1–1, AT1–1, T0–7, AT0–1, TUPO–1, RS–1, TAC–1, TUPK–1, SNG–1 and ON–1 to ground. In turn, relay AT4 operates relay ATK of FIG. 10 over the path through the associated contact symmetric.

After the operation of relays AT4 and ATK, relay TU4 is operated over the path through the TU4 relay winding, contact CD0–6, lead TUL4, contact AT4–5 and ATK–1, and resistance TUR to potential P22. The circuit actions that follow the operation of relay TU4 are essentially the same as hereinbefore described under the section entitled 'Establishing Connections From Trunk Circuit to Operator Position" and therefore need not be described further.

It is to be understood that the hereinbefore described equipment arrangements are illustrative of the application of the principles of my invention. In light of this teaching, it is apparent that numerous other arrangements may be devised by those skilled in the art without departing from the spirit and scope of the invention.

What is claimed is:

1. In combination, a plurality of operator positions, groups of calling circuits, each one of said circuits having means for initially requesting routine connections to any of said positions upon the receipt of a call and means for subsequently requesting priority connections to any of said positions during said call and after said one circuit has been disconnected from said position, means responsive to the receipt of routine connection requests and priority connection requests from said circuits in each of at least two of said groups for registering said requests, and means activated by said registering means for connecting each of said priority requesting circuits to one of said positions before any of said routine connection requesting circuits.

2. In combination, a plurality of operator positions, groups of trunks, each of said trunks having means for requesting routine and priority connections to any one of said positions, connector means operable for establishing routine and priority path connections for said trunks to any one of said positions, each of said trunks being connected to said connector means over a single path, a register for registering routine connection requests received from any of said trunks, another register for registering priority connection requests received from any of said trunks, means responsive to the registration of routine and priority connection requests in said registers for selecting each priority requesting trunk in each of said groups for connection to any one of said positions before any of said trunks having a registered routine connection request, and means activated by said selecting means for operating said connector means to establish a path connection for each selected trunk to one of said positions in the order in which it is selected.

3. The combination in accordance with claim 2 wherein said selecting means comprises means responsive to the registration of routine and priority connection requests in said registers for initially selecting for service one of said groups of trunks having at least one registered priority request, and means for controlling said connecting means to connect successively each priority requesting trunk of said selected group to one of said positions; and further comprising means activated immediately after the last of said priority requesting trunks in said selected group has been connected to one of said positions for advancing said selecting means to select for service another group of said trunks having at least one registered priority request in one of said registers, and thereby to serve priority requesting ones of said trunks before any routine connection requesting one of said trunks.

4. The combination in accordance with claim 3 wherein said selecting means further comprises means activated immediately after the last of said priority requesting trunks of the last selected group of said groups having a priority requesting trunk has been connected to one of said positions for advancing said selecting means to select for service one of said groups of said trunks having a registered routine connection request.

5. In a switching system, a plurality of operator positions, groups of incoming communication circuits, each of said circuits having means for requesting non-priority and priority interconnection with any one of said positions, means responsive to the receipt of non-priority and priority connection requests from any of said groups of circuits for registering said requests, means activated by said registering means for identifying each of said groups of circuits having registered non-priority and priority connection requests, means controlled by said identifying means for initially selecting for service one of said groups of circuits having a registered priority request, means activated by said selecting means for preferring in a predetermined order each of said priority requesting circuits in each selected one of said groups for interconnection with one of said positions over any non-priority requesting circuit in the same selected group, switch means controlled by said preferring means for interconnecting each preferred one of said circuits with one of said positions, and means activated by said identifying means immediately after the last priority requesting circuit in said initially selected group has been interconnected with one of said positions for advancing said selecting means to select another of said groups of circuits having a priority request registered in said registering means.

6. In a switching system according to claim 5, the combination wherein said registering means comprises an individual pair of registers associated with each of said incoming circuits, one of said pair of registers being responsive to the receipt of a non-priority request from said associated circuit for registering that request, and the other of said pair of registers being responsive to the receipt of a priority request from said associated circuit for registering that request; said identifying means comprising an individual pair of storage devices associated with each group of said circuits, one of said pair of devices being activatable by any one of said non-priority registers associated with said circuits of said associated group for identifying when a circuit of said associated group is requesting non-priority interconnections with one of said positions, and the other of said pair of devices being activatable by any one of said priority registers associated with said circuits of said associated group for identifying when a circuit of said associated group is requesting priority interconnections with one of said positions; and said advancing means being activatable by any one of said other of said pair of devices immediately after the last priority requesting circuit in the associated group has been interconnected with one of said positions for advancing said selecting means to select another of said groups of circuits having a registered priority request in its associated priority register.

7. In a switching system according to claim 6, the combination wherein each of said trunk circuits comprises a first conductor used for requesting non-priority interconnections with any one of said positions and a second conductor for requesting priority interconnections with said positions; each of said pair of registers comprises a first relay individually connectable to said first conductor of said associated circuit and responsive to an electrical signal received from said associated circuit over said last-mentioned conductor for registering a non-priority connection request, and a second relay individually connected to said second conductor of said associated circuit and responsive to an electrical signal received from said associated circuit over said last-mentioned conductor for registering a priority connection request; each of said storage devices comprises a first relay activatable by any one of said first register relays connectable with said circuits of said associated group for identifying when a circuit of that group is requesting non-priority interconnections, and a second relay activatable by any one of said second register relays connected to said circuit of said associated group for identifying when a circuit of that group is requesting priority interconnections; said advancing means comprises a relay activatable under control of contacts of each of said identifying relays for advancing said selecting means to select another of said groups of circuits; and said selecting means comprises a relay circuit including contacts of said identifying and advancing relays for controlling the selection of each of said groups of circuits.

8. In a telephone system, groups of trunk circuits, each of said groups used for serving a different class-of-call; a plurality of operator positions, each of said positions being selectively preconditioned for serving a predetermined number of said classes-of-calls; each of said circuits having a first conductor used for requesting connections to said positions on a non-priority basis and a second conductor used for requesting connections to said positions on a priority basis; a position connector comprising switch means operable for connecting said circuits to said positions, a plurality of registers responsive to the receipt of electrical signals over said conductors for registering received non-priority and priority connection requests for said circuits, means for identifying each of the classes-of-calls served by the requesting circuits, means for indicating the availability of said positions to serve the calls in said requesting circuits, and means controlled by said indicating means for signifying each of said groups of circuits having non-priority and priority connection requests registered in said registers when at least one of said positions is available to serve said calls in said last-mentioned circuits; and a control circuit comprising means activated by said signifying means for storing the identity of each of said groups of circuits having a request registered in said registers, means activated by said storing means for selecting in a predetermined order each priority requesting circuit in each of the identified groups for connection individually to one of said positions before selecting any non-priority requesting circuit in said identified groups for connection to said positions, means operated by said selecting means for receiving the identity of the class-of-call served by each selected circuit from said identifying means in said connector, means activated by said receiving means for successively selecting one of said positions available to serve the call in each of said selected circuits, and means controlled by said position selecting means for operating said switch means to interconnect each of said selected circuits individually with one of said selected positions.

9. In a telephone system according to claim 8, the combination wherein said storing means comprises non-priority and priority relay registers activated by said signifying means for storing the identity of said groups of circuits having registered non-priority and priority requests; said selecting means comprises means including relay devices and contacts of the relays of said non-priority and priority registers for successively selecting for service each of said groups of circuits having a priority request registered in said register means in preference to any of said groups of circuits having only non-priority requests registered in said register means, and circuit means including contacts of said register relays and said relay devices for controlling said switch means to interconnect each priority requesting circuit in each of said selected groups with one of said positions before any non-priority requesting circuit in any of said selected groups.

10. In a telephone system according to claim 9, the combination wherein said circuit means comprises a select next group circuit including a relay operated under control of contacts of said relay devices immediately after the last priority requesting circuit in one of said selected groups has been connected to one of said operator positions for advancing said selecting means to select another one of said groups of circuits for service.

11. In a telephone system, a plurality of operator positions; groups of trunk circuits, each of said circuits having means for selectively requesting non-priority and priority connections to any of said positions; means responsive to the receipt of non-priority requests from any of said circuits for registering these requests; means activated by said registering means for identifying each of said groups of circuits having said registered requests; means operable under control of said identifying means for successively selecting each of said non-priority requesting circuits of said identified groups for connection individually to one of said positions; another registering means responsive to the receipt of a priority connection request from any of said circuits after the selection of any one of said non-priority requesting circuits of said identified groups for connection to one of said positions for registering said priority requests; additional means activated by said other registering means for enabling said identifying means to identify said groups of circuits having said registered priority requests, means thereafter activated by said identifying means for altering the operation of said selecting means to select successively each of said priority requesting circuits in said identified groups for connection individually to one of said positions after said selected one of said non-priority requesting circuits and before all other non-priority requesting circuits in said identified groups awaiting connections to said positions, and switch means controlled by said selecting means for connecting each selected one of said circuits to one of said positions in the order in which it is selected.

12. In a telephone system according to claim 11, the combination wherein said selecting means comprises means controlled by said identifying means and responsive to the registration of said priority requests for successively selecting for service each of said groups of circuits having at least one of said registered priority requests in preference to any of said groups of circuits having only registered non-priority requests, and a select next group circuit operated by said identifying means immediately after the last priority requesting circuit of one of said selected groups has been connected to one of said operator positions for advancing said selecting means to select for service another one of said identified groups of circuits having a registered priority request.

13. In a telephone system according to claim 12, the combination wherein said select next group circuit comprises means controlled by said identifying means immediately after the last of said priority requesting circuits of the last selected group having a priority requesting circuit has been connected to one of said positions for selecting one of said identified groups of said circuits having at least one of said registered non-priority requests.

14. In a telephone system, a plurality of operator positions, groups of trunk circuits, each of said circuits having a first signaling means for requesting routine connections to said positions and a second signaling means for requesting priority connections to said positions, a position connector comprising: switch means operable for connecting said circuits to said positions; a plurality of registers, each of said registers being individually associated with one of said signaling means for registering received routine and priority connection requests; means responsive to the registration of routine connection requests for signifying each of said groups of circuits having said registered requests; and start means responsive to the registration of requests in any of said registers for supplying a start signal; and a controller means comprising: means operated by said start signal for interconnecting said controller means with said position connector to control the connection of requesting circuits to said positions; means activated by said signifying means for storing the identity of each of said groups having said registered requests; means operative under control of said storing means for successively selecting each of said routine connection requesting circuits of said identified groups for connection to an individual one of said positions; means activated by said selecting means for operating said switch means to connect each selected circuit to one of said positions; and a priority request waiting means operable for releasing said interconnecting means to disconnect said controller means from said position connector; said position connector including additional means responsive to the registration of a priority connection request in one of said registers after the selection of one of said routine requesting circuits for operating said priority request waiting means following the connection of said selected one of said circuits to one of said positions; auxiliary means in said signifying means responsive to the registration of said priority request for signifying the group of circuits having said registered priority request; said start means being thereafter responsive to said start signal for again interconnecting said controller means and said position connector; said storing means being again activated by said signifying means for storing the identity of each of said groups having registered routine requests and each of said groups having registered priority requests; and said selecting means thereafter being operated by said storing means for successively selecting each of said priority requesting circuits of said identified groups for connection to an individual one of said positions before any of said routine connection requesting circuits of said identified groups.

15. In a telephone system, a plurality of operator positions, groups of trunk circuits, each of said circuits having a first conductor for requesting non-priority connections to said positions and a second conductor for requesting priority connections to said positions, a position connector comprising: switch means operable for connecting each of said circuits with any of said positions, a non-priority register having relays connected to said first conductors for registering non-priority requests received from said circuits, a priority register having relays connected to said second conductors for registering priority connection requests received from said circuits, means activated by said non-priority register for identifying each of said groups having at least one trunk circuit requesting non-priority connections, means activated by said priority register for identifying each of said groups having at least one priority requesting trunk circuit, means for indicating the availability of said positions for connection to said requesting circuits, and means jointly controlled by said indicating means and said identifying means for supplying a start signal, and controller means comprising means operated by said start signal for interconnecting said controller means and said position connector to control the connection of said requesting circuits to said positions, means activated by said identifying means to store the identity of each of said identified trunk groups, means activated by said identifying means after the activation of said store means for temporarily blocking the storage of the identity of any other of said groups having trunk circuits which may subsequently request connections to said positions, means operated by said store means for successively selecting each of said identified groups having at least one priority requesting trunk circuit for service before any identified group having only a non-priority requesting trunk circuit, means for preferring each priority requesting trunk circuit in each selected group for connection to said positions over any non-priority requesting trunk circuit in the same group, means controlled by said preferring means for operating said switch means to interconnect each preferred trunk circuit in each selected group with an individual one of said positions and a select next group circuit including a relay jointly controlled by said selecting means and the last priority requesting trunk circuit in each selected group for advancing said selected means to select another of said identified groups immediately after said last-mentioned trunk circuit has been connected to one of said positions.

References Cited by the Examiner
UNITED STATES PATENTS
2,881,261 4/1959 Molnar _____ 179—27.1
3,133,153 5/1964 Bonanno _____ 179—27.23

KATHLEEN H. CLAFFY, *Primary Examiner.*
L. A. WRIGHT, *Assistant Examiner.*